(12) United States Patent
Koetting et al.

(10) Patent No.: US 8,067,111 B2
(45) Date of Patent: *Nov. 29, 2011

(54) BATTERY MODULE HAVING BATTERY CELL ASSEMBLY WITH HEAT EXCHANGER

(75) Inventors: William Koetting, Davisburg, MI (US); Prabhaker Patil, Southfield, MI (US); Mohamed Alamgir, Troy, MI (US); Martin Klein, Grosse Pointe Park, MI (US); Kwok Tom, Madison Heights, MI (US)

(73) Assignee: LG Chem, Ltd. (KR)

( * ) Notice: Subject to any disclaimer, the term of this patent is extended or adjusted under 35 U.S.C. 154(b) by 594 days.

This patent is subject to a terminal disclaimer.

(21) Appl. No.: 12/164,780

(22) Filed: Jun. 30, 2008

(65) Prior Publication Data
US 2009/0325053 A1  Dec. 31, 2009

(51) Int. Cl.
*H01M 6/42* (2006.01)
*H01M 10/50* (2006.01)

(52) U.S. Cl. ......... 429/120; 429/151; 429/152; 429/159

(58) Field of Classification Search .......... 429/148–160, 429/163, 175–159, 186, 120
See application file for complete search history.

(56) References Cited

U.S. PATENT DOCUMENTS

| | | | |
|---|---|---|---|
| 4,390,841 A | 6/1983 | Martin et al. | |
| 4,396,689 A | 8/1983 | Grimes et al. | |
| 5,322,745 A * | 6/1994 | Yanagihara et al. | 429/59 |
| 5,356,735 A * | 10/1994 | Meadows et al. | 429/120 |
| 5,364,711 A | 11/1994 | Yamada et al. | |
| 5,487,955 A | 1/1996 | Korall et al. | |
| 5,606,242 A | 2/1997 | Hull et al. | |
| 5,652,502 A | 7/1997 | Van Phuoc et al. | |
| 5,658,682 A | 8/1997 | Usuda et al. | |
| 5,796,239 A | 8/1998 | Van Phuoc et al. | |
| 5,825,155 A | 10/1998 | Ito et al. | |

(Continued)

FOREIGN PATENT DOCUMENTS
JP     2002319383 A     10/2002
(Continued)

OTHER PUBLICATIONS

U.S. Appl. No. 12/165,100, filed Jun. 30, 2008 entitled Battery Cell Assembly Having Heat Exchanger with Serpentine Flow Path.

(Continued)

*Primary Examiner* — Basia Ridley
*Assistant Examiner* — Jacob Buchanan
(74) *Attorney, Agent, or Firm* — Cantor Colburn LLP

(57) ABSTRACT

A battery module having a battery cell assembly with a heat exchanger is provided. The assembly includes a first battery cell having a first side and a second side, and a second battery cell having a first side and a second side. The first side of the second battery cell contacts the second side of the first battery cell. The assembly further includes a heat exchanger. A first side of the heat exchanger contacts the second side of the second battery cell. The battery cell assembly further includes a third battery cell having a first side and a second side. The first side of the third battery cell contacts a second side of the heat exchanger. The heat exchanger removes heat energy from the first, second, and third battery cells to maintain the first, second, and third battery cells at substantially a desired temperature.

11 Claims, 36 Drawing Sheets

U.S. PATENT DOCUMENTS

| | | | |
|---|---|---|---|
| 5,982,403 A | 11/1999 | Inagaki | |
| 6,016,047 A | 1/2000 | Notten et al. | |
| 6,353,815 B1 | 3/2002 | Vilim et al. | |
| 6,362,598 B2 | 3/2002 | Laig-Horstebrock et al. | |
| 6,441,586 B1 | 8/2002 | Tate, Jr. et al. | |
| 6,515,454 B2 | 2/2003 | Schoch | |
| 6,534,954 B1 | 3/2003 | Plett | |
| 6,563,318 B2 | 5/2003 | Kawakami et al. | |
| 6,724,172 B2 | 4/2004 | Koo | |
| 6,821,671 B2 | 11/2004 | Hinton et al. | |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,892,148 B2 | 5/2005 | Barsoukov et al. | |
| 6,927,554 B2 | 8/2005 | Tate, Jr. et al. | |
| 6,943,528 B2 | 9/2005 | Scoch | |
| 6,967,466 B2 | 11/2005 | Koch | |
| 7,012,434 B2 | 3/2006 | Koch | |
| 7,039,534 B1 | 5/2006 | Ryno et al. | |
| 7,061,246 B2 | 6/2006 | Dougherty et al. | |
| 7,072,871 B1 | 7/2006 | Tinnemeyer | |
| 7,074,517 B2 | 7/2006 | Higashino | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,197,487 B2 | 3/2007 | Hansen et al. | |
| 7,199,557 B2 | 4/2007 | Anbuky et al. | |
| 7,250,741 B2 | 7/2007 | Koo et al. | |
| 7,253,587 B2 | 8/2007 | Meissner | |
| 7,315,789 B2 | 1/2008 | Plett | |
| 7,321,220 B2 | 1/2008 | Plett | |
| 7,327,147 B2 | 2/2008 | Koch | |
| 7,656,122 B2 | 2/2010 | Plett | |
| 7,723,957 B2 | 5/2010 | Plett | |
| 7,794,868 B2 | 9/2010 | Yang | |
| 7,883,793 B2 * | 2/2011 | Niedzwiecki et al. | 429/120 |
| 2003/0184307 A1 | 10/2003 | Kozlowski et al. | |
| 2005/0100786 A1 | 5/2005 | Ryu et al. | |
| 2005/0127874 A1 | 6/2005 | Lim et al. | |
| 2005/0194936 A1 | 9/2005 | Cho | |
| 2006/0097698 A1 | 5/2006 | Plett | |
| 2006/0100833 A1 | 5/2006 | Plett | |
| 2006/0111854 A1 | 5/2006 | Plett | |
| 2006/0111870 A1 | 5/2006 | Plett | |
| 2006/0214633 A1 | 9/2006 | Cho | |
| 2006/0234119 A1 * | 10/2006 | Kruger et al. | 429/160 |
| 2006/0286450 A1 * | 12/2006 | Yoon et al. | 429/180 |
| 2007/0035307 A1 | 2/2007 | Scoch | |
| 2007/0037051 A1 | 2/2007 | Kim et al. | |
| 2007/0046292 A1 | 3/2007 | Plett | |
| 2007/0072066 A1 * | 3/2007 | Yoon et al. | 429/99 |
| 2007/0103120 A1 | 5/2007 | Plett | |
| 2007/0120533 A1 | 5/2007 | Plett | |
| 2007/0188143 A1 | 8/2007 | Plett | |
| 2007/0236182 A1 | 10/2007 | Plett | |
| 2008/0057392 A1 | 3/2008 | Takamatsu et al. | |
| 2008/0094035 A1 | 4/2008 | Plett | |
| 2010/0086842 A1 | 4/2010 | Yang | |
| 2010/0209760 A1 * | 8/2010 | Yoshihara et al. | 429/162 |
| 2010/0266883 A1 | 10/2010 | Koetting et al. | |
| 2010/0275619 A1 | 11/2010 | Koetting et al. | |
| 2010/0276132 A1 | 11/2010 | Payne | |
| 2010/0279152 A1 | 11/2010 | Payne | |
| 2010/0279153 A1 | 11/2010 | Payne | |
| 2010/0279154 A1 | 11/2010 | Koetting et al. | |
| 2011/0027625 A1 | 2/2011 | Payne | |
| 2011/0027640 A1 | 2/2011 | Gadawski et al. | |
| 2011/0052959 A1 | 3/2011 | Koetting et al. | |

FOREIGN PATENT DOCUMENTS

| | | | |
|---|---|---|---|
| KR | 100765659 B1 | | 10/2007 |
| KR | 100889241 B1 | | 4/2008 |
| KR | 20080047641 A | | 5/2008 |
| KR | 100921346 B1 | | 10/2009 |
| WO | WO 2006/101343 | * | 9/2006 |

OTHER PUBLICATIONS

U.S. Appl. No. 12/164,445, filed Jun. 30, 2008 entitled Battery Module Having a Rubber Cooling Manifold.

U.S. Appl. No. 12/164,741, filed Jun. 30, 2008 entitled Battery Module Having Battery Cell Assemblies with Alignment-Coupling Features.

U.S. Appl. No. 12/016,630, filed Jan. 18, 2008 entitled Battery Cell Assembly and Method for Assembling the Battery Cell Assembly.

U.S. Appl. No. 11/828,927, filed Jul. 26, 2007 entitled Battery Cell Carrier Assembly Having a Battery Cell Carrier for Holding a Battery Cell Therein.

U.S. Appl. No. 12/164,627, filed Jun. 30, 2008 entitled Battery Module Having Cooling Manifold and Method for Cooling Battery Module.

International Search Report for International application No. PCT/KR2005/003755 dated Mar. 2, 2006.

International Search Report for International application No. PCT/KR2009/000258 dated Aug. 28, 2009.

International Search Report for International application No. PCT/KR2009/003430 dated Feb. 3, 2010.

International Search report for International application No. PCT/KR2009/003434 dated Jan. 18, 2010.

U.S. Appl. No. 12/794,949, filed on Jun. 7, 2010 entitled Battery Module and Methods for Bonding a Cell Terminal of a Battery to an Interconnect Member.

U.S. Appl. No. 12/857,908, filed on Aug. 17, 2010 entitled Battery Cell Assemblies.

U.S. Appl. No. 12/861,364, filed on Aug. 23, 2010 entitled Connecting Assembly.

U.S. Appl. No. 12/861,375, filed on Aug. 23, 2010 entitled attery System and Manifold Assembly Having a Manifold Member and a Connecting Fitting.

U.S. Appl. No. 12/861,381, filed on Aug. 23, 2010 entitled End Cap.

U.S. Appl. No. 12/861,394, filed on Aug. 23, 2010 entitled Battery System and Manifold Assembly With Two Manifold Members Removably Coupled Together.

U.S. Appl. No. 12/868,111, filed on Aug. 25, 2010 entitled Battery Module and Methods for Bonding Cell Terminals of Battery Cells Together.

U.S. Appl. No. 13/073,000, filed on Mar. 28, 2011 entitled Battery Disconnect Unit and Method of Assembling the Battery Disconnect Unit.

U.S. Appl. No. 13/076,774, filed on Mar. 31, 2011 entitled Battery Pack Having Liquid Leak Detection System.

* cited by examiner

BATTERY MODULE HAVING BATTERY CELL ASSEMBLY WITH HEAT EXCHANGER

TECHNICAL FIELD

This application relates generally to a battery module having a battery cell assembly with a heat exchanger.

BACKGROUND OF THE INVENTION

Battery packs generate heat during usage. To prevent degradation of the battery packs, the battery packs should be cooled. However, another cooling system may not uniformly cool battery cells in a battery pack. The inventors herein have recognized that if battery cells in a battery pack are not uniformly cooled, the battery cells can undesirably have differing operational characteristics including differing output voltages.

Accordingly, the inventors herein have recognized a need for an improved battery module that minimizes and/or eliminates the above-mentioned deficiency.

SUMMARY OF THE INVENTION

A battery cell assembly in accordance with an exemplary embodiment is provided. The battery cell assembly includes a first battery cell having a first side and a second side. The battery cell assembly further includes a second battery cell having a first side and a second side. The first side of the second battery cell contacts the second side of the first battery cell. The battery cell assembly further includes a heat exchanger having a first side and a second side. The first side of the heat exchanger contacts the second side of the second battery cell. The battery cell assembly further includes a third battery cell having a first side and a second side. The first side of the third battery cell contacts the second side of the heat exchanger. The heat exchanger is configured to remove heat energy from the first, second, and third battery cells to maintain the first, second, and third battery cells at substantially a desired temperature.

A battery module in accordance with an exemplary embodiment is provided. The battery module includes a first battery cell assembly having a first battery cell with a first side and a second side. The first battery cell assembly further includes a second battery cell with a first side and a second side. The first side of the second battery cell contacts the second side of the first battery cell. The first battery cell assembly further includes a first heat exchanger with a first side and a second side. The first side of the first heat exchanger contacts the second side of the second battery cell. The first battery cell assembly further includes a third battery cell with a first side and a second side. The first side of the third battery cell contacts the second side of the first heat exchanger. The first heat exchanger is configured to remove heat energy from the first, second, and third battery cells to maintain the first, second, and third battery cells at substantially a desired temperature. The battery module further includes a second battery cell assembly having a fourth battery cell with a first side and a second side. The first side of the fourth battery cell contacts the second side of the third battery cell of the first battery cell assembly. The second battery cell assembly further includes a second heat exchanger with a first side and a second side. The first side of the second heat exchanger contacts the second side of the fourth battery cell. The second battery cell assembly further includes a fifth battery cell with a first side and a second side. The first side of the fifth battery cell contacts the second side of the second heat exchanger. The second battery cell assembly further includes a sixth battery cell with a first side and a second side. The first side of the sixth battery cell contacts the second side of the fifth battery cell. The second heat exchanger is configured to remove heat energy from the fourth, fifth and sixth battery cells to maintain the fourth, fifth and sixth battery cells at substantially the desired temperature.

DETAILED DESCRIPTION OF AN EXEMPLARY EMBODIMENT

Figure 1:
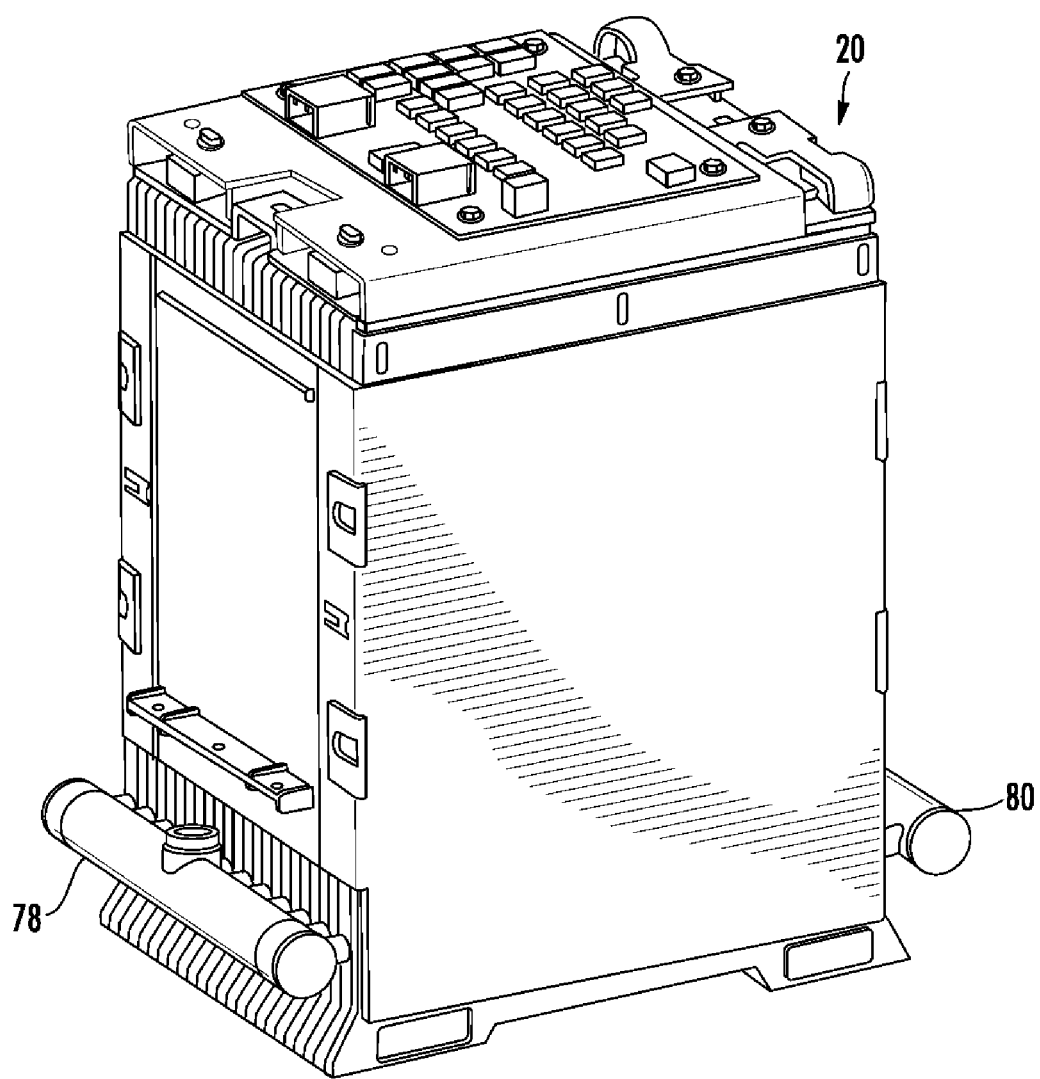
FIG. 1 is a schematic of a battery module in accordance with an exemplary embodiment.
Figure 2:
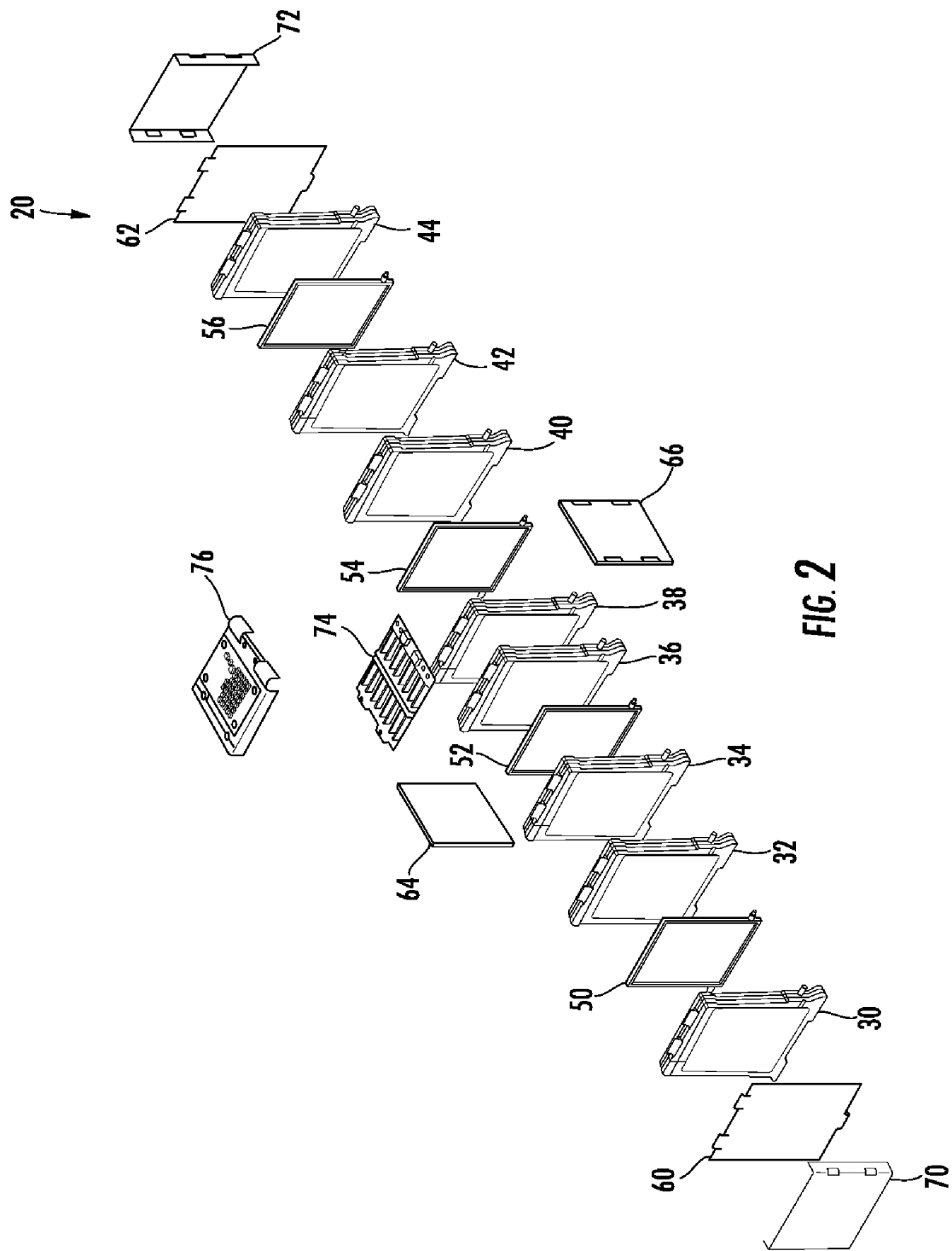
FIG. 2 is an exploded schematic of a portion of the battery module of FIG. 1.

Referring to FIGS. 1 and 2, a battery module 20 for providing electrical power is provided. The battery module 20 includes battery cell assemblies 30, 32, 34, 36, 38, 40, 42, 44, heat exchangers 50, 52, 54, 56, side plates 60, 62, 64, 66, coupling plates 70, 72, an interconnect assembly 74, a cover 76, and cooling manifolds 78, 80. A battery cell assembly is defined as a housing having a battery cell therein. A battery module is defined as at least two battery cell assemblies coupled together.

The battery cell assemblies 30, 32, 34, 36, 38, 40, 42, 44 are electrically coupled together utilizing the interconnect assembly 74. In particular, the interconnect assembly 74 electrically couples together electrical terminals from the battery cell assemblies in a desired configuration to provide an electrical current and voltage therefrom.

The heat exchangers 50, 52, 54, 56 receive a fluid from the cooling manifold 78 to cool the battery cell assemblies. The heated fluid from the heat exchangers 50, 52, 54, 56 is received by the cooling manifold 80.

The side plates 60, 62, 64, 66 are coupled to the battery cell assemblies to provide additional support for the battery cell assemblies. The coupling plates 70, 72 are provided to engage the side plates 64, 66 to provide additional support for the battery cell assemblies. The cover plate 76 is provided to cover the interconnect assembly 74.

Referring to FIGS. 3, 4, 5, 6 and 7, a battery cell assembly 32 in accordance with an exemplary embodiment that is utilized in the battery module 20 will be explained. The battery cell assembly 32 includes a rectangular ring-shaped frame member 90, a battery cell 92, a securement ring-shaped member 94, a battery cell 96, a rectangular ring-shaped frame member 98, a heat exchanger 100, a securement ring-shaped member 102, a battery cell 104, and a rectangular ring-shaped frame member 106. An advantage of the battery cell assembly 32 is that the assembly 32 is packaged such that a single heat exchanger 100 can cool the battery cells 92, 96, 104 to maintain the battery cells at a desired temperature. Further, the rectangular ring-shaped frame members 90, 98, 106 have alignment-coupling features for easily coupling the frame members 90, 98, 106 together while preventing incorrect alignment and placement of the frame members 90, 98, 106 relative to one another.

Referring to FIGS. 3, 8, 9, 10 and 11, the rectangular ring-shaped frame member 90 is configured to be coupled to the rectangular ring-shaped frame member 98 for holding the battery cell 92, the securement ring-shaped member 94, and the battery cell 96 therebetween. The rectangular ring-shaped frame member 90 includes a side 110 and an opposite side 112. Further, in an exemplary embodiment, the frame member 90 includes side walls 114, 116, a lower wall 118, and an upper wall 120. The side walls 114, 116 are disposed apart from one another and are substantially parallel to one another. The lower wall 118 extends between the side walls 114, 116. Further, the upper wall 120 extends between the side walls 114, 116. The side walls 114, 116, the lower wall 118, and the upper wall 120 define an open region 122 therebetween.

Referring to FIGS. 3, 8, 9 and 10, the features of the rectangular ring-shaped frame member 90 on the side 110 will now be discussed. The lower wall 118 includes alignment-coupling features 130, 132 disposed on opposite ends of the lower wall 118. Further, the upper wall 120 includes alignment-coupling features 134, 136 disposed on opposite ends of the upper wall 120. The alignment-coupling features 130, 132, 134, 136 are configured to couple and align with specific alignment-coupling features on the battery cell assembly 30 shown in FIG. 2. Further, the side walls 114, 116, the lower wall 118, and the upper wall 120 define a ledge portion 139. Further, the side walls 114, 116, have horizontal grooves 137, 138 for receiving a portion of an inlet port and an outlet port, respectively, of the heat exchanger 50 thereon shown in FIG. 2.

Figure 18:
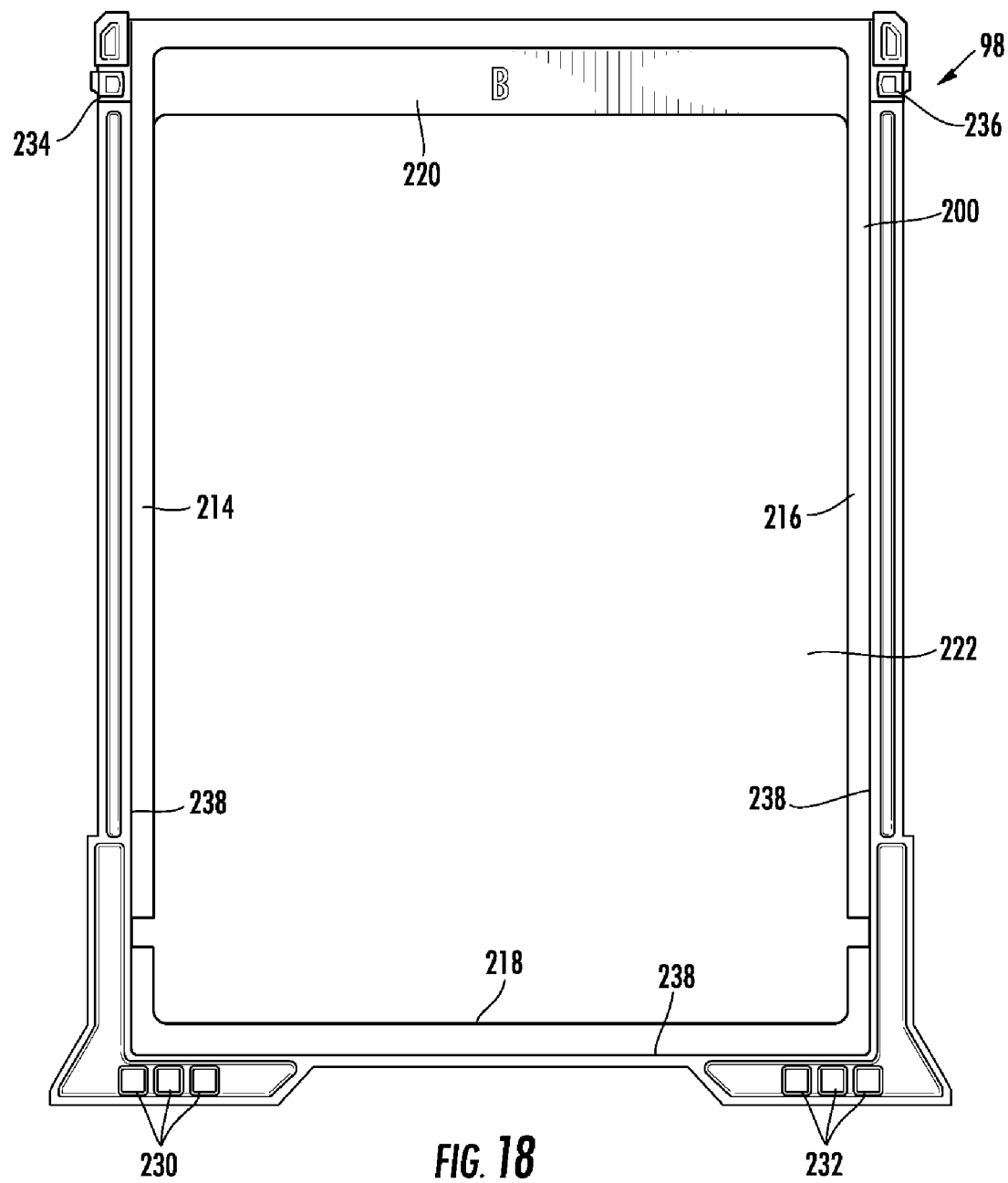
FIG. 18 is a schematic of a first side of a second rectangular ring-shaped frame member utilized in the battery cell assembly of FIG. 3.
Figure 19:
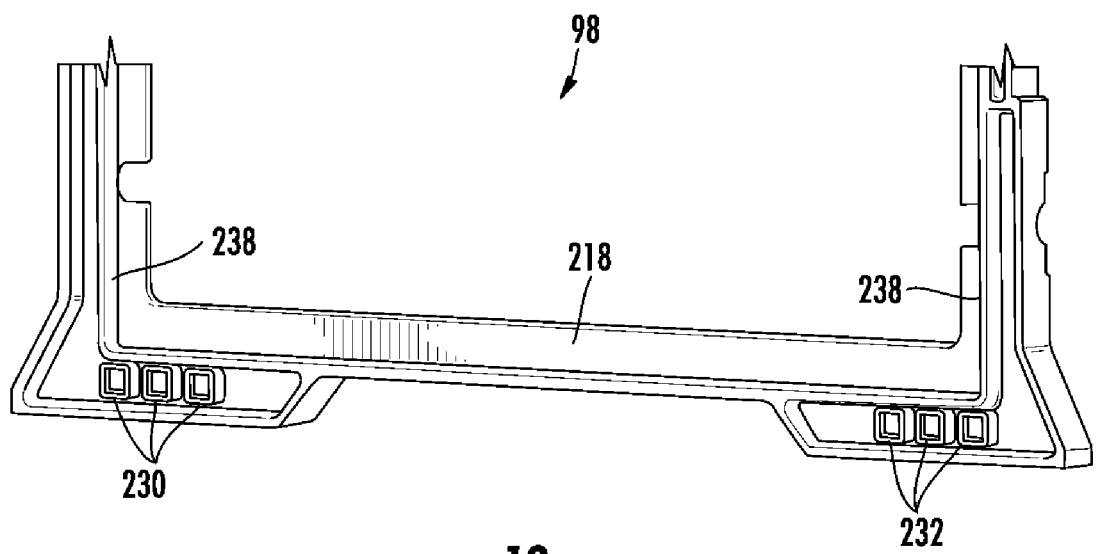
FIG. 19 is a schematic of a bottom portion of the first side of the second rectangular ring-shaped frame member of FIG. 18.
Figure 20:
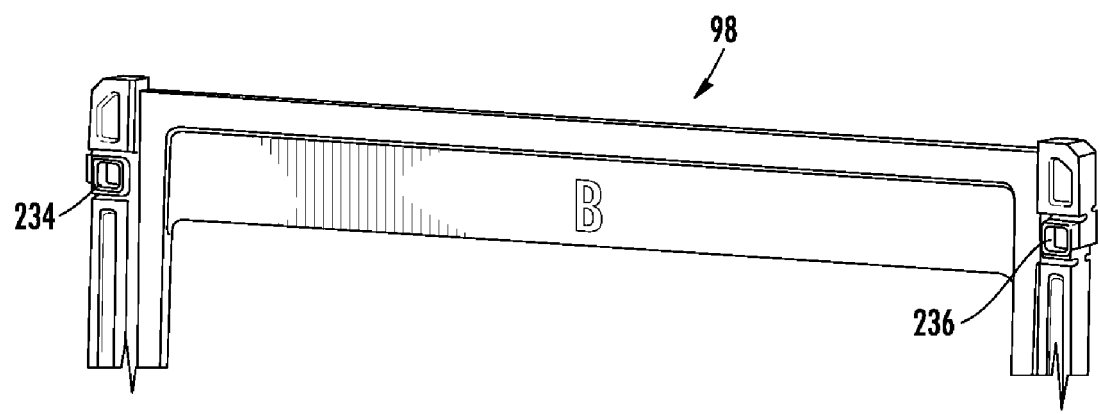
FIG. 20 is a schematic of a top portion of the first side of the second rectangular ring-shaped frame member of FIG. 18.
Figure 21:
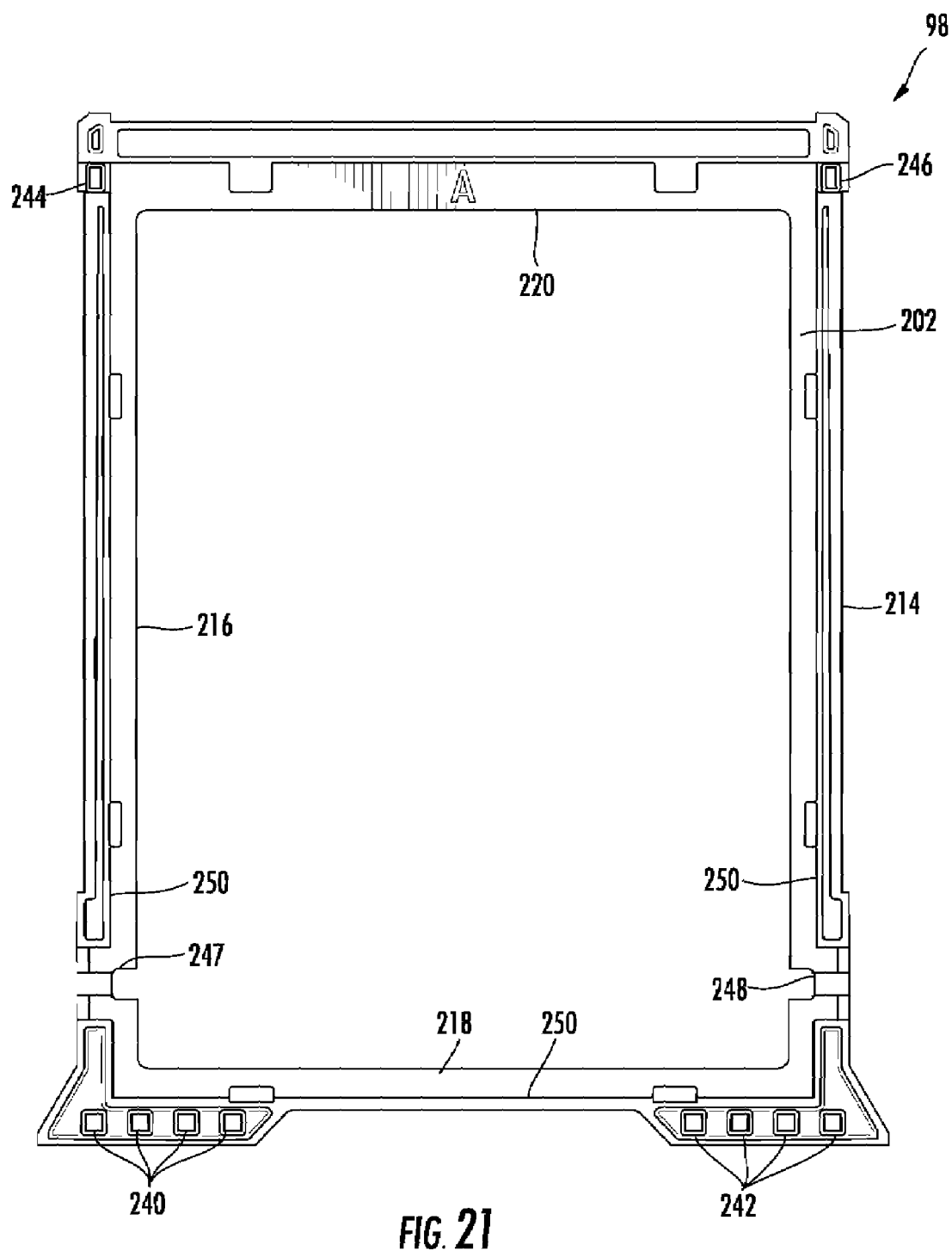
FIG. 21 is a schematic of a second side of the second rectangular ring-shaped frame member of FIG. 18.
Figure 22:
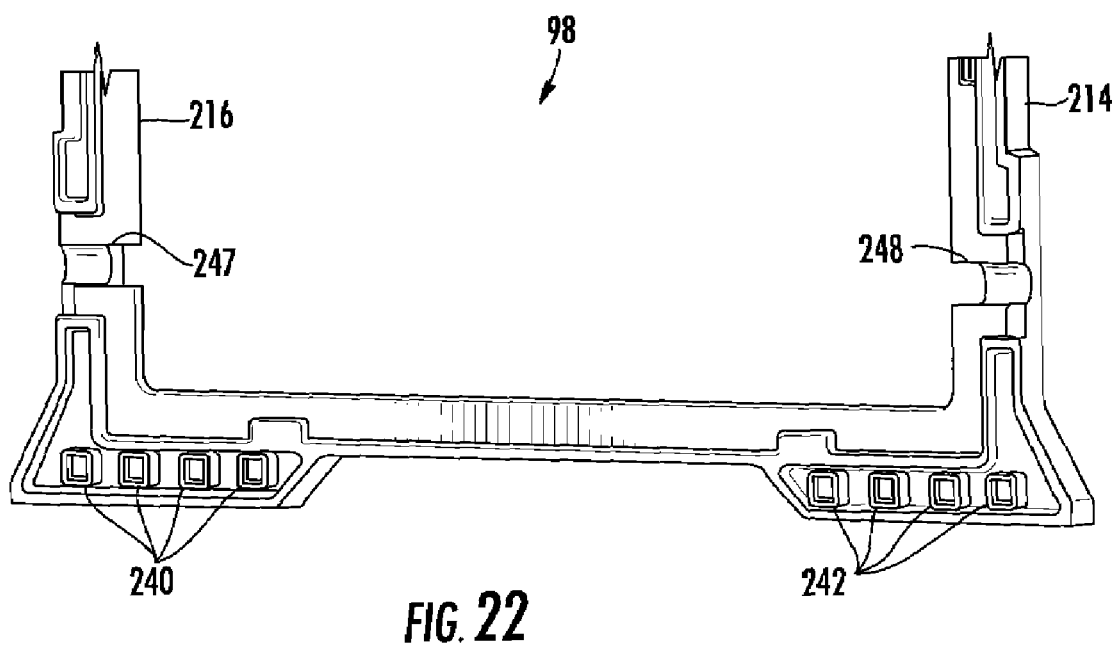
FIG. 22 is a schematic of a bottom portion of the second side of the second rectangular ring-shaped frame member of FIG. 21.
Figure 23:
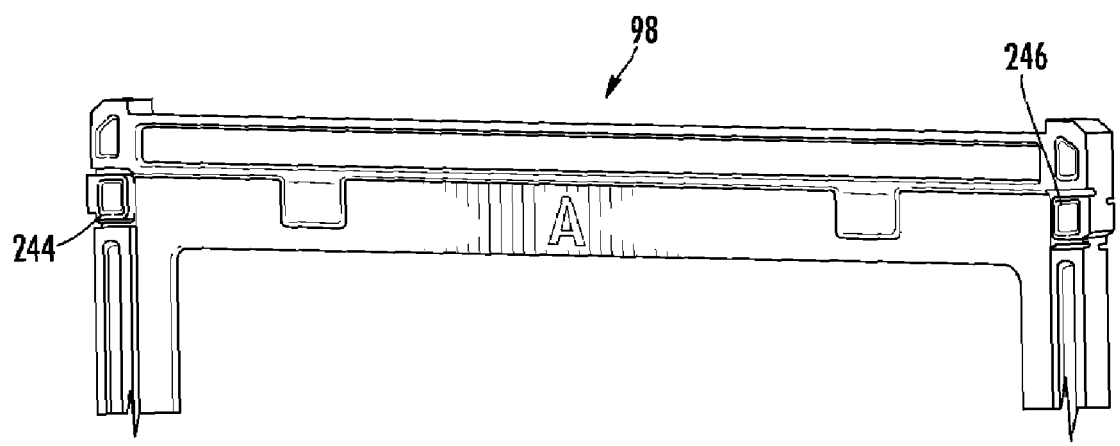
FIG. 23 is a schematic of a top portion of the second side of the second rectangular ring-shaped frame member of FIG. 21.
Figure 24:
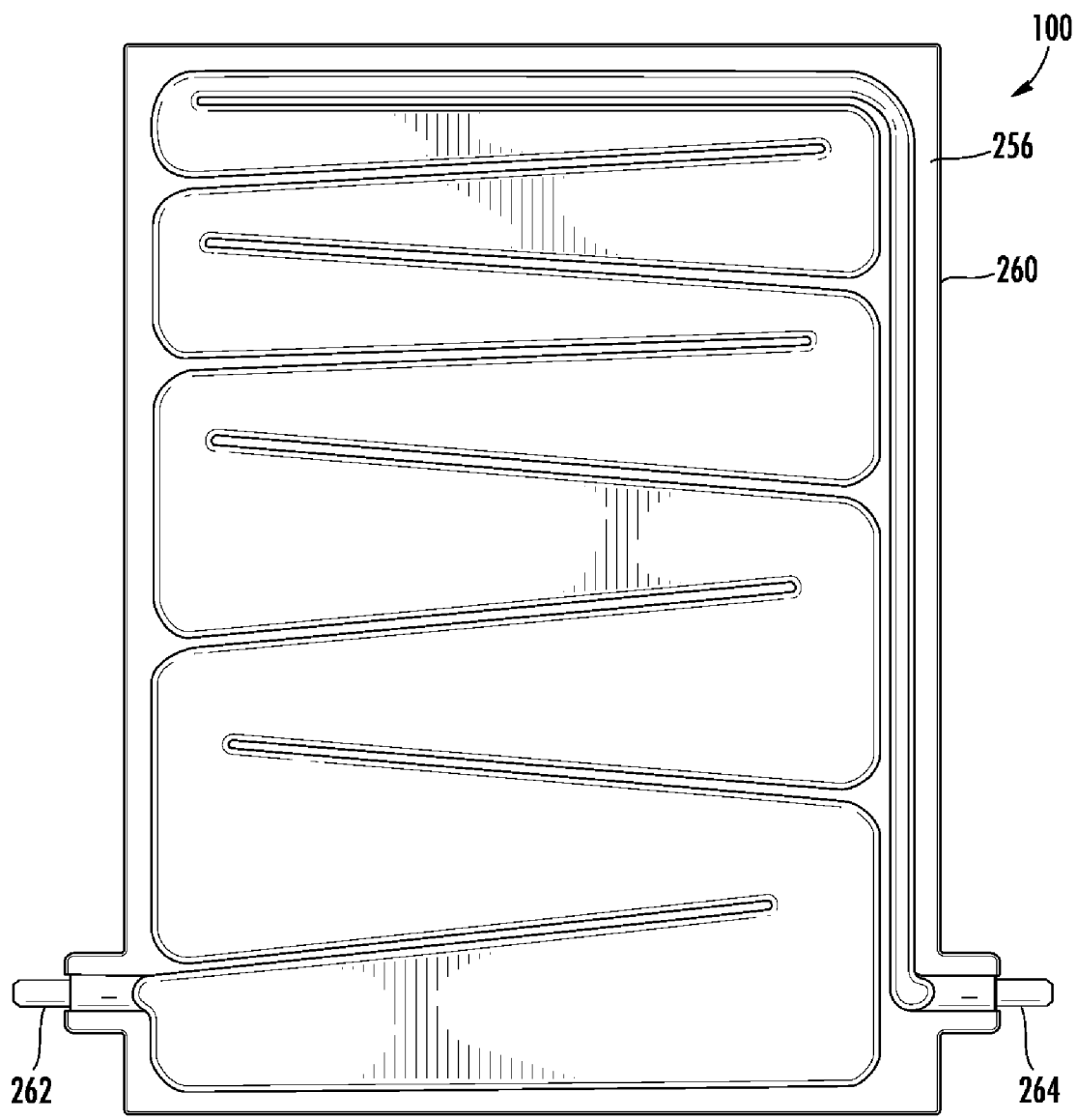
FIG. 24 is a schematic of a first side of a heat exchanger utilized in the battery cell assembly of FIG. 3.
Figure 25:
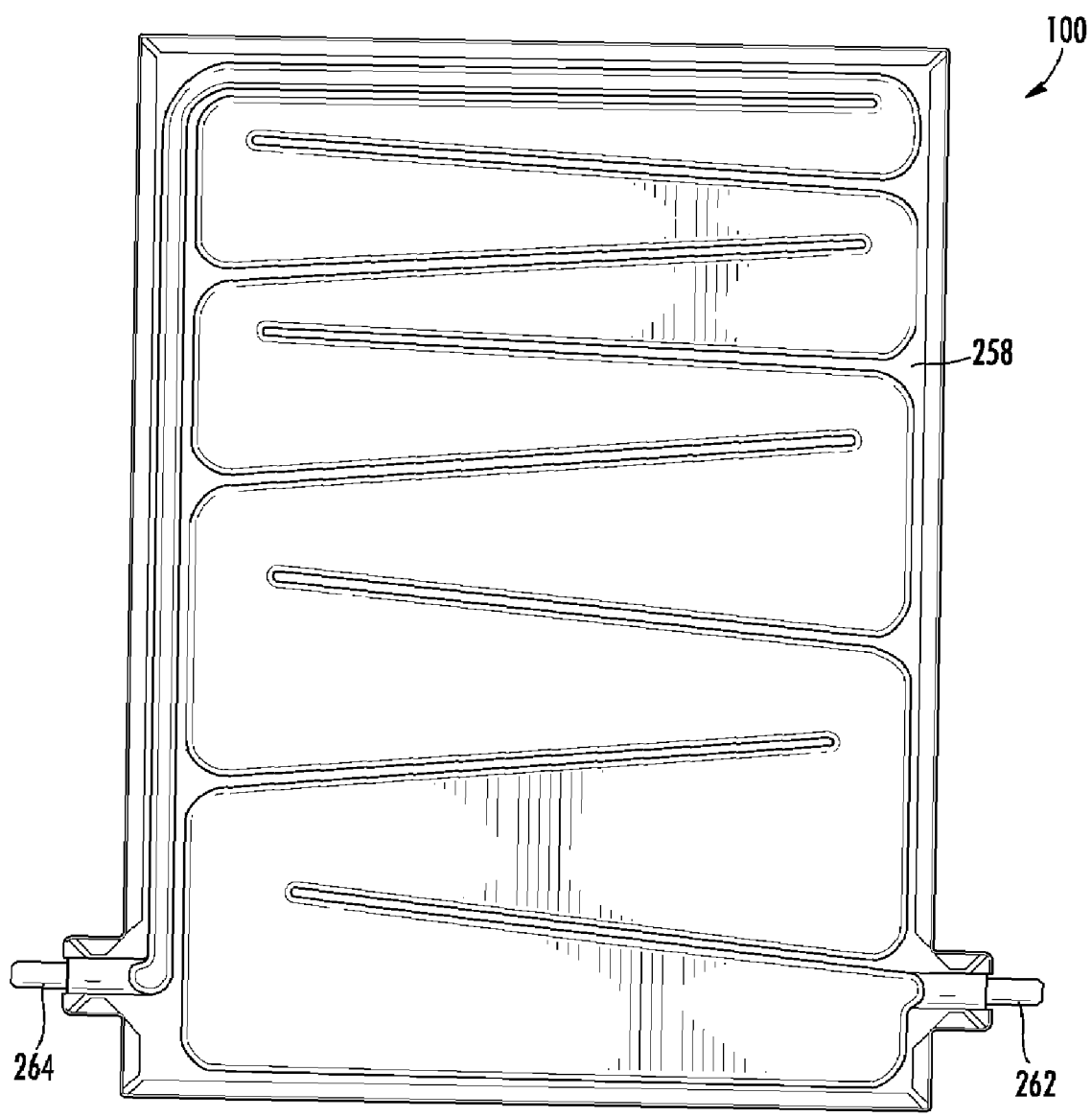
FIG. 25 is a schematic of a second side of the heat exchanger of FIG. 24.
Figure 26:
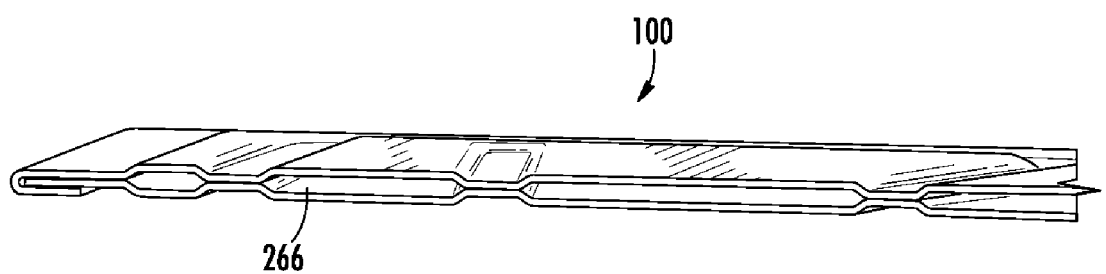
FIG. 26 is a cross-sectional schematic of the heat exchanger of FIG. 24.

Referring to FIGS. 3, 11, 12 and 13, the features of the rectangular ring-shaped frame member 90 on the side 112 will now be discussed. The lower wall 118 includes alignment-coupling features 140, 142 disposed on opposite ends of the lower wall 118. Further, the upper wall 120 includes alignment-coupling features 144, 146 disposed on opposite ends of the upper wall 120. The alignment-coupling features 140, 142, 144, 146 are configured to couple and align with alignment-coupling features 232, 230, 236, 234, respectively, on the battery cell assembly 98 shown in FIG. 18. Further, the side walls 114, 116 and lower wall 118 and upper wall 120 define a ledge portion 150 for receiving a portion of the battery cell 92 thereon. Finally, referring to FIGS. 11 and 18, the side 112 of the frame member 98 includes a side coupling identifier "B" which indicates the side 112 is to be coupled to the side 200 of the frame member 98 having the side coupling identifier "B."

Figure 3:
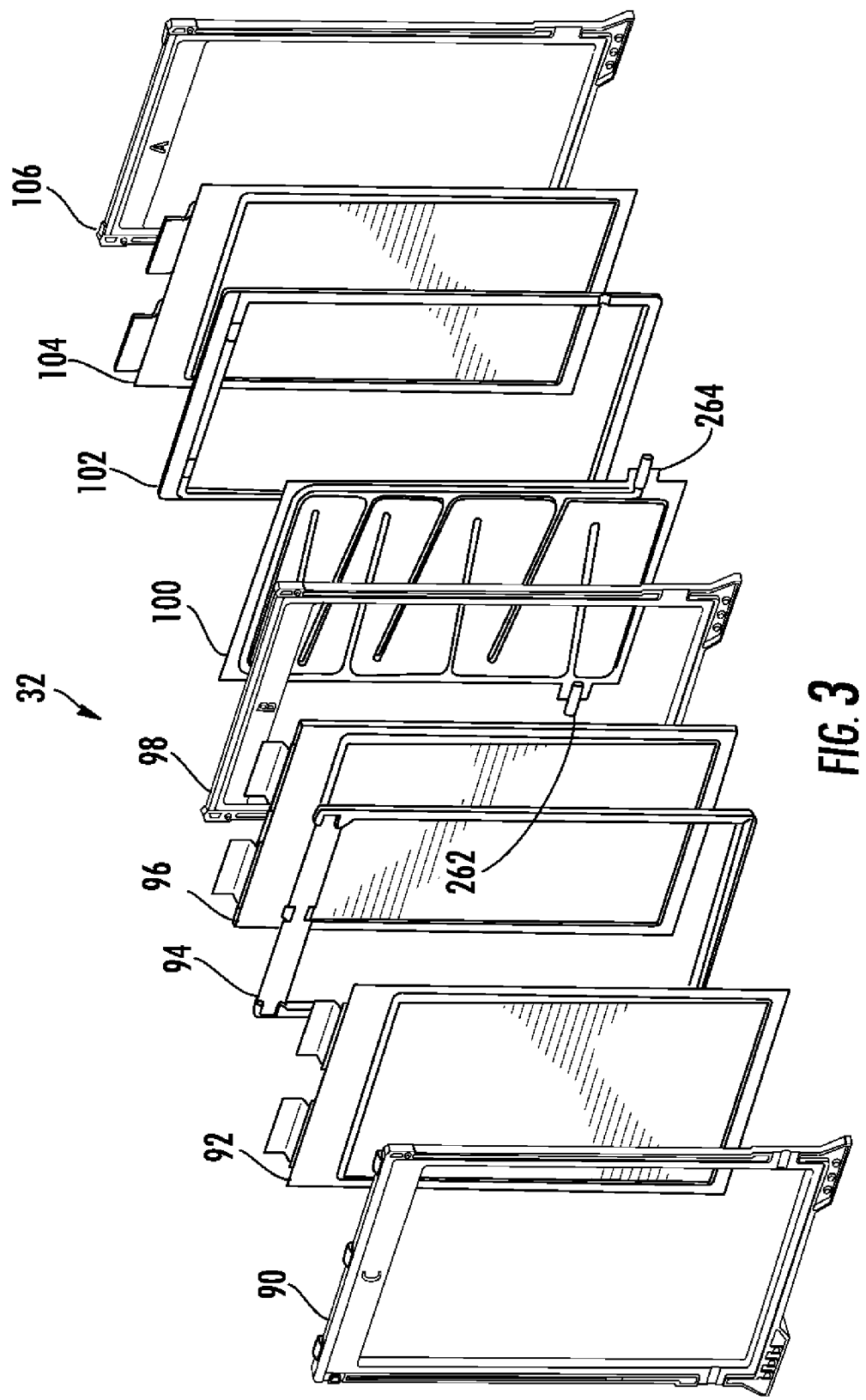
FIG. 3 is an exploded schematic of a battery cell assembly in accordance with another exemplary embodiment, utilized in the battery module of FIG. 2.
Figure 4:
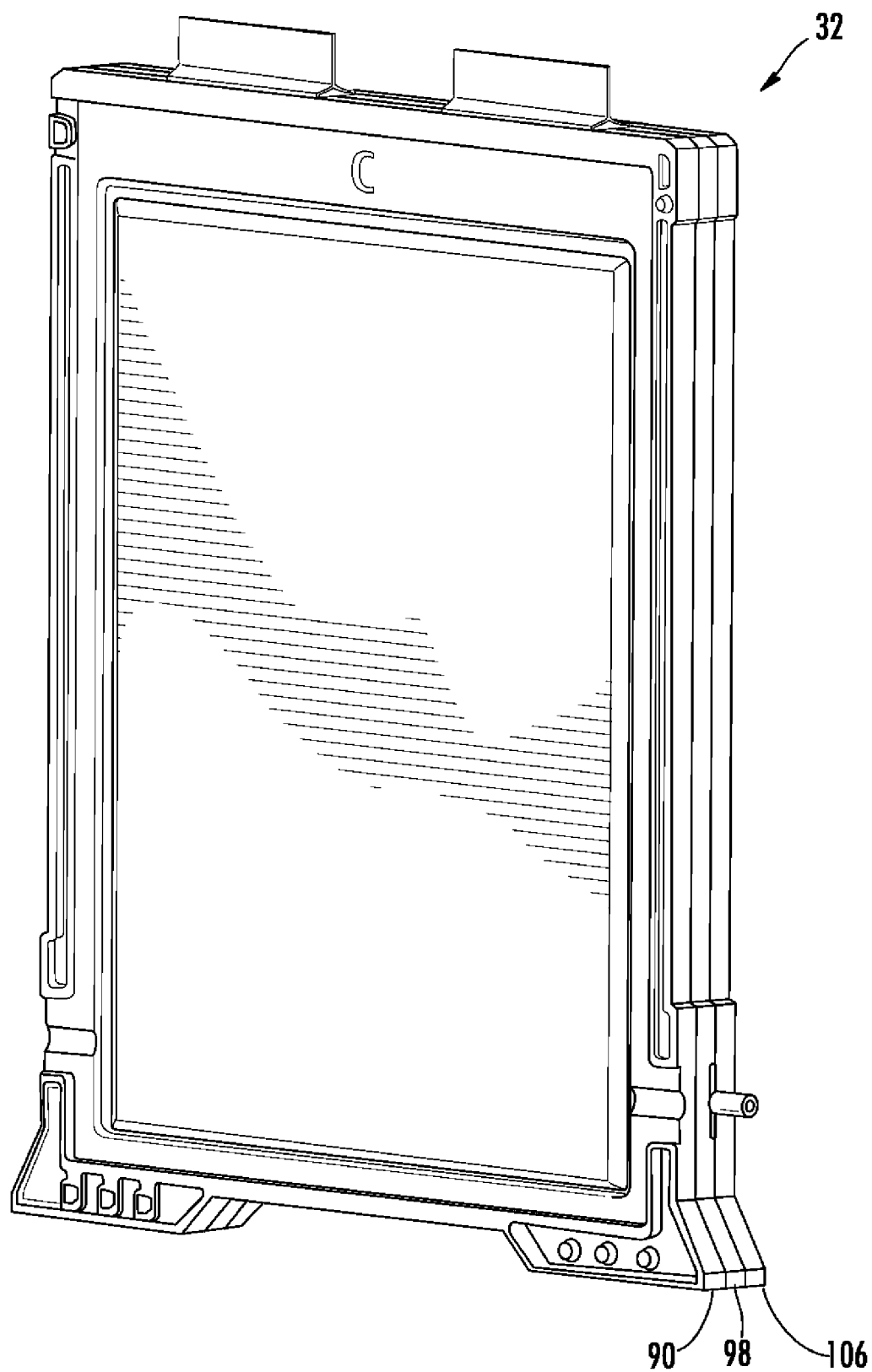
FIG. 4 is another schematic of the battery cell assembly of FIG. 3.
Figure 5:
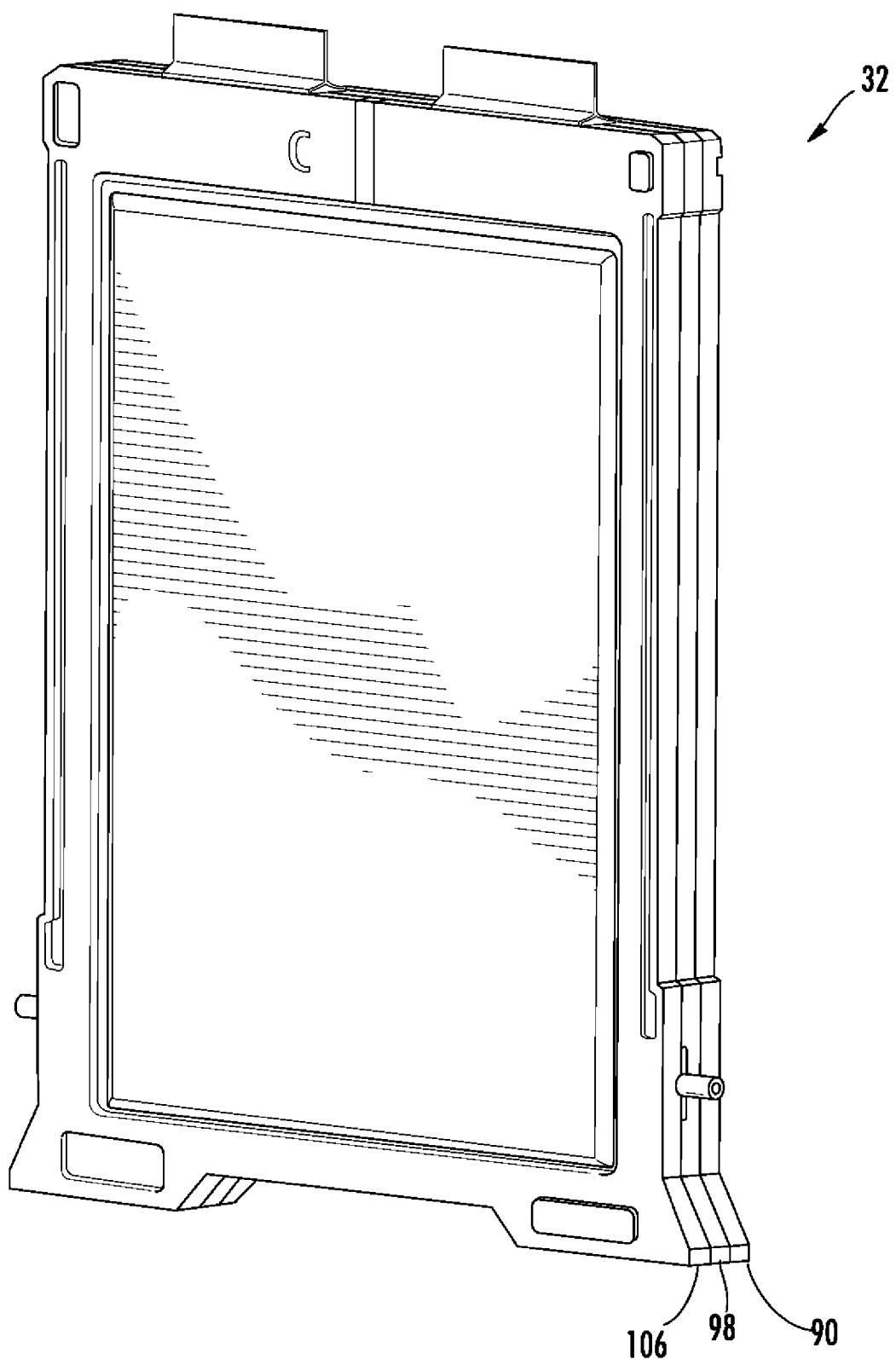
FIG. 5 is another schematic of the battery cell assembly of FIG. 3.
Figure 6:
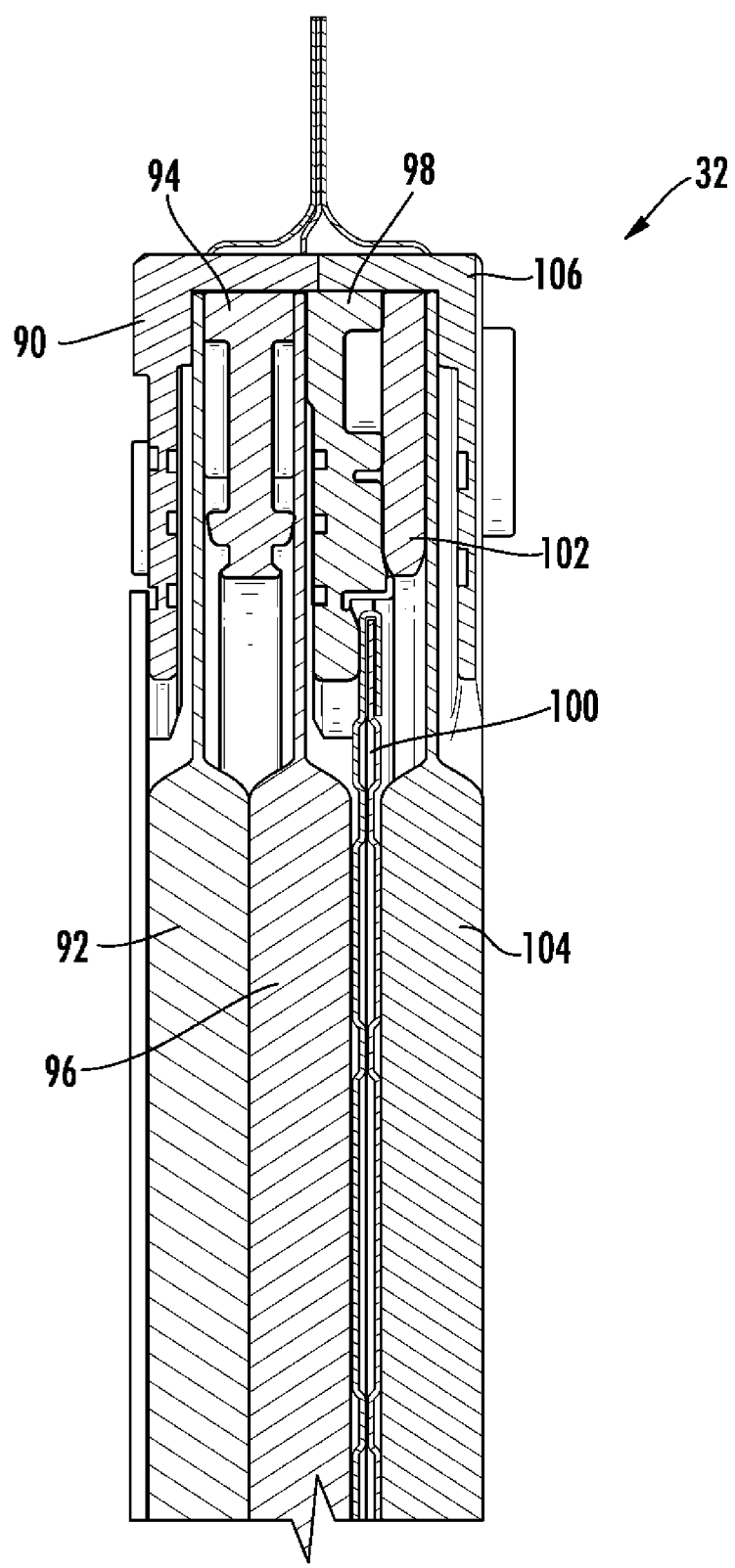
FIG. 6 is a cross-sectional schematic of a top portion of the battery cell assembly of FIG. 3.
Figure 7:
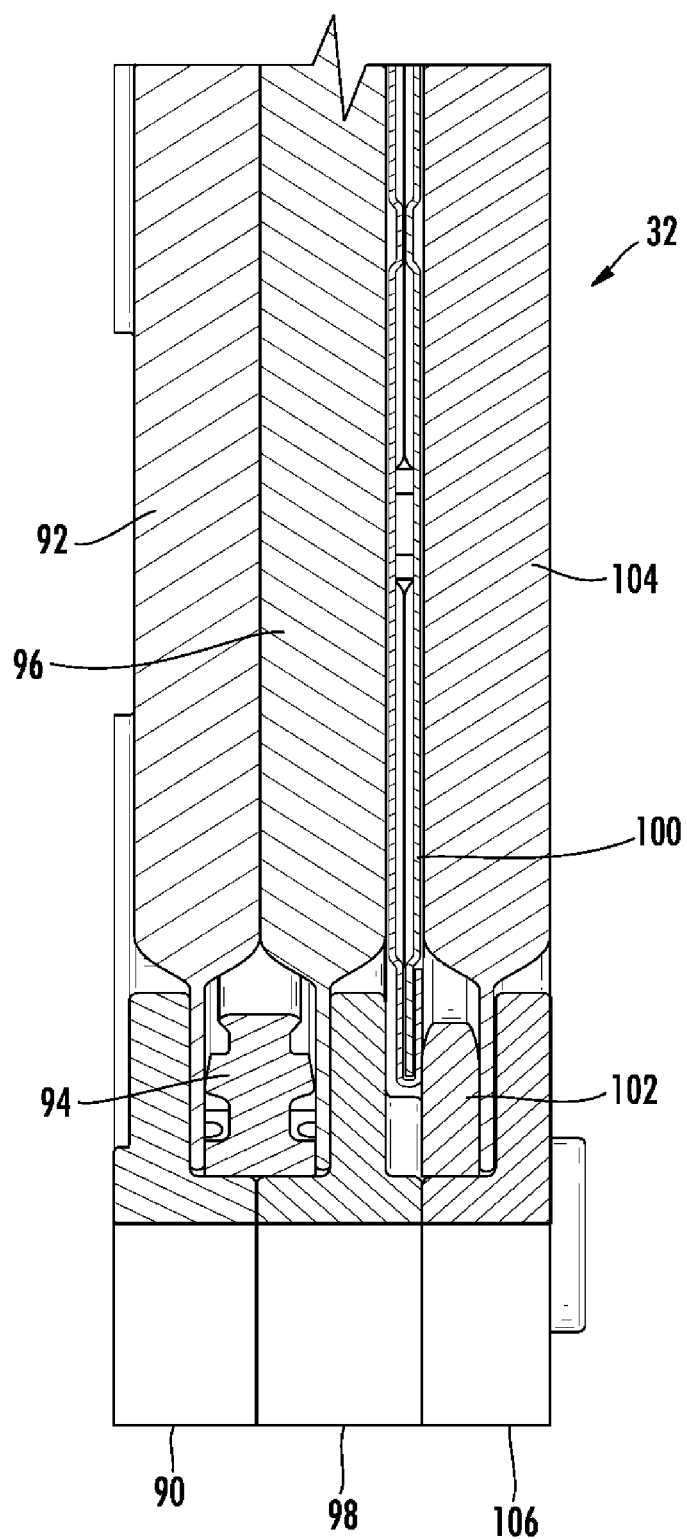
FIG. 7 is a cross-sectional schematic of a bottom portion of the battery cell assembly of FIG. 3.
Figure 8:
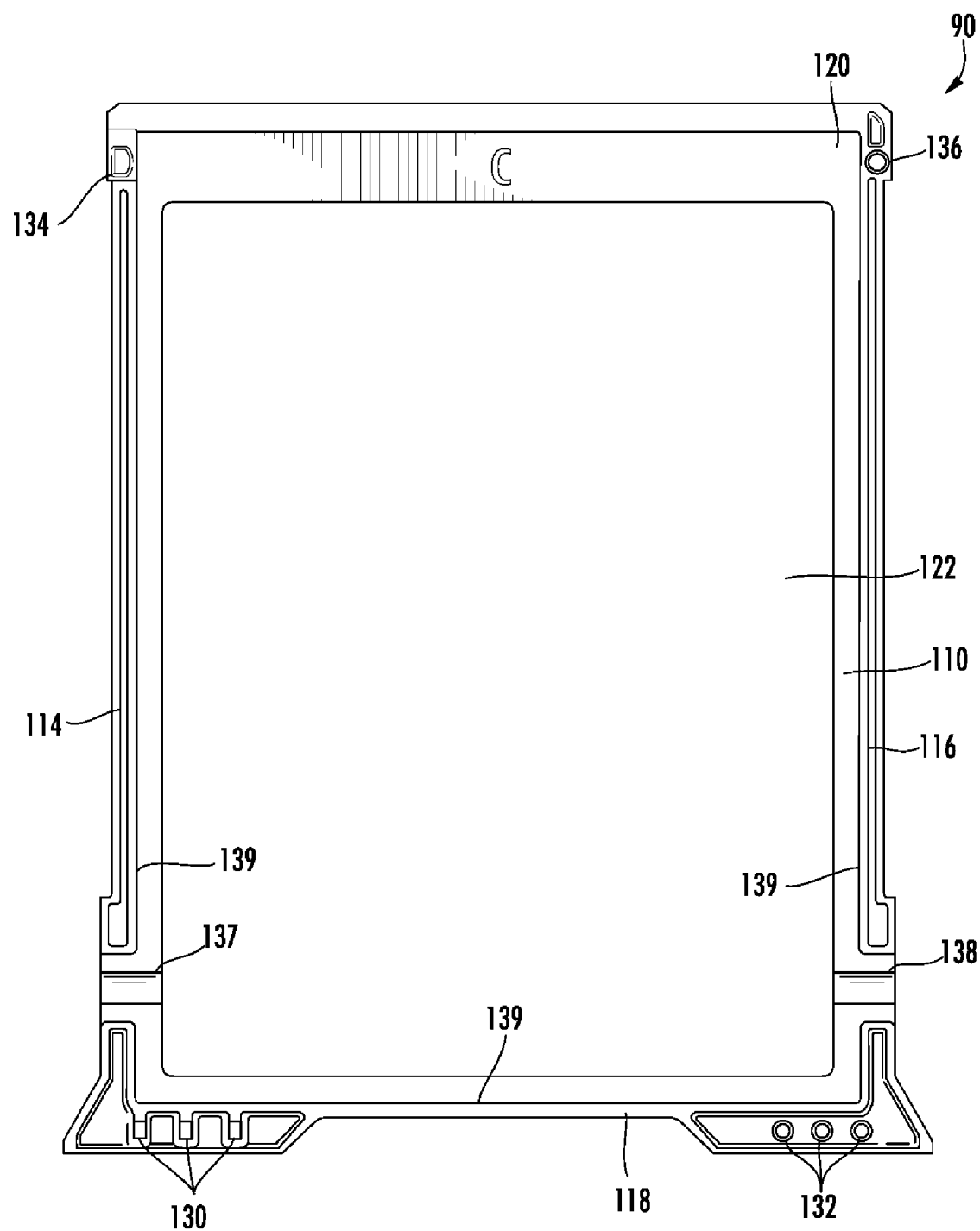
FIG. 8 is a schematic of a first side of a first rectangular ring-shaped frame member utilized in the battery cell assembly of FIG. 3.
Figure 9:
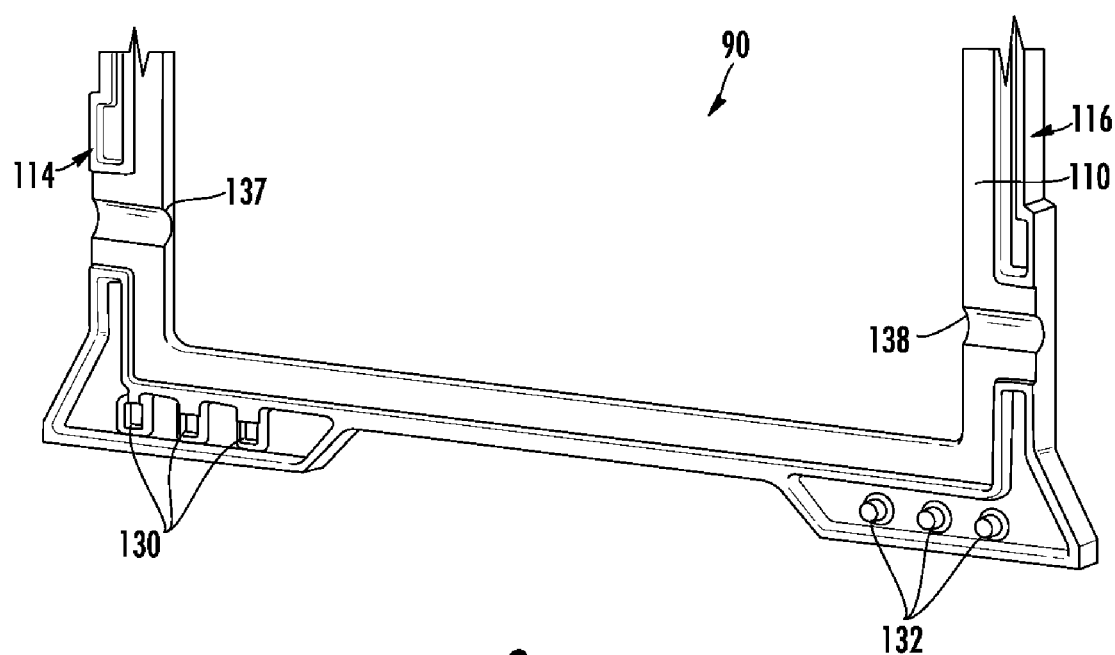
FIG. 9 is a schematic of a bottom portion of the first side of the first rectangular ring-shaped frame member of FIG. 8.
Figure 10:
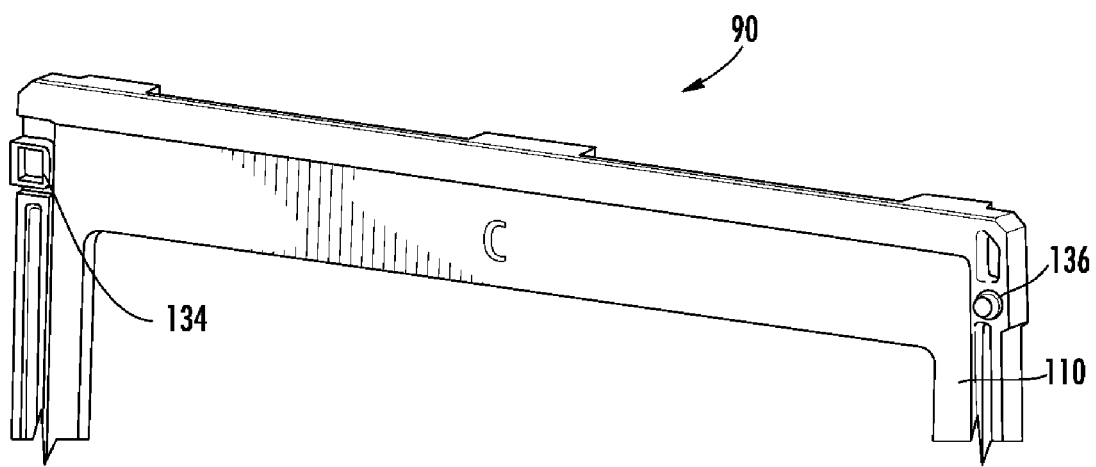
FIG. 10 is a schematic of a top portion of the first side of the first rectangular ring-shaped frame member of FIG. 8.
Figure 11:
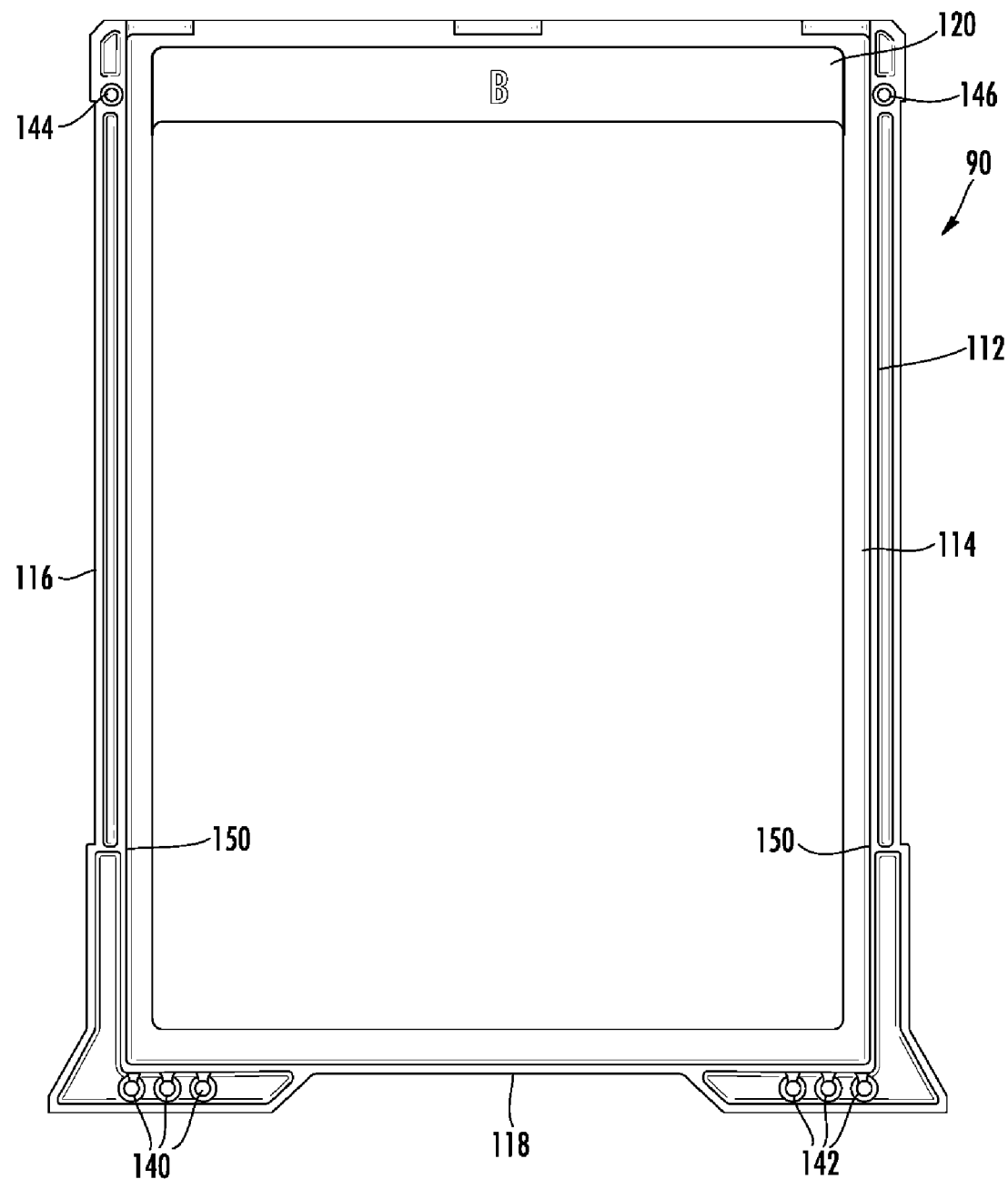
FIG. 11 is a schematic of a second side of the first rectangular ring-shaped frame member of FIG. 8.
Figure 12:
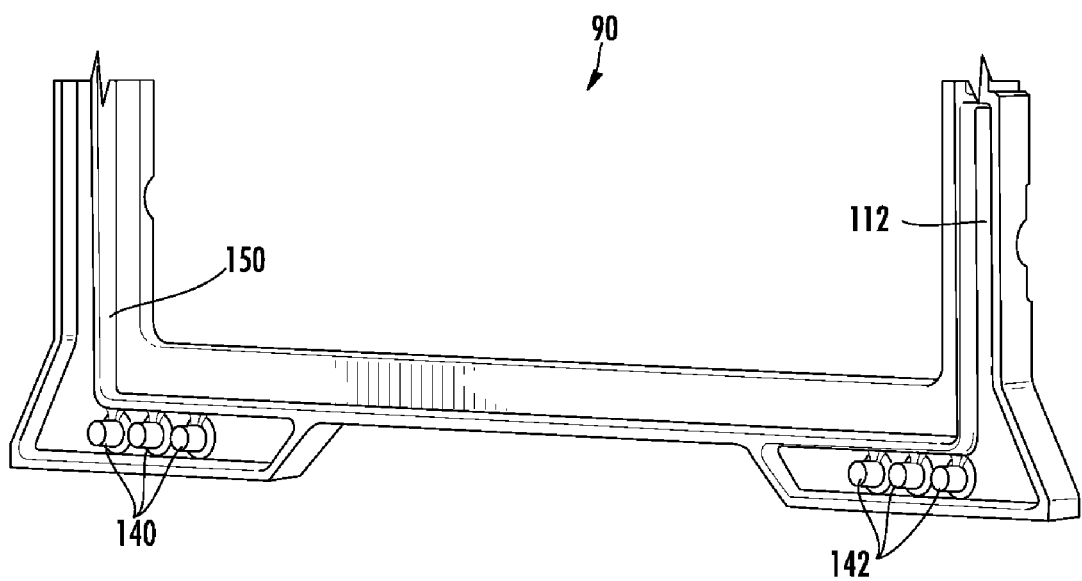
FIG. 12 is a schematic of a bottom portion of the second side of the first rectangular ring-shaped frame member of FIG. 11.
Figure 13:
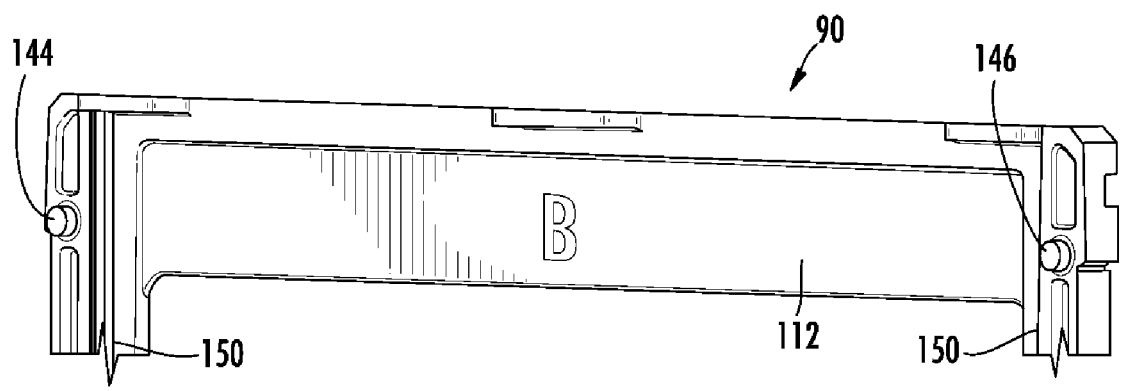
FIG. 13 is a schematic of a top portion of the second side of the first rectangular ring-shaped frame member of FIG. 11.
Figure 14:
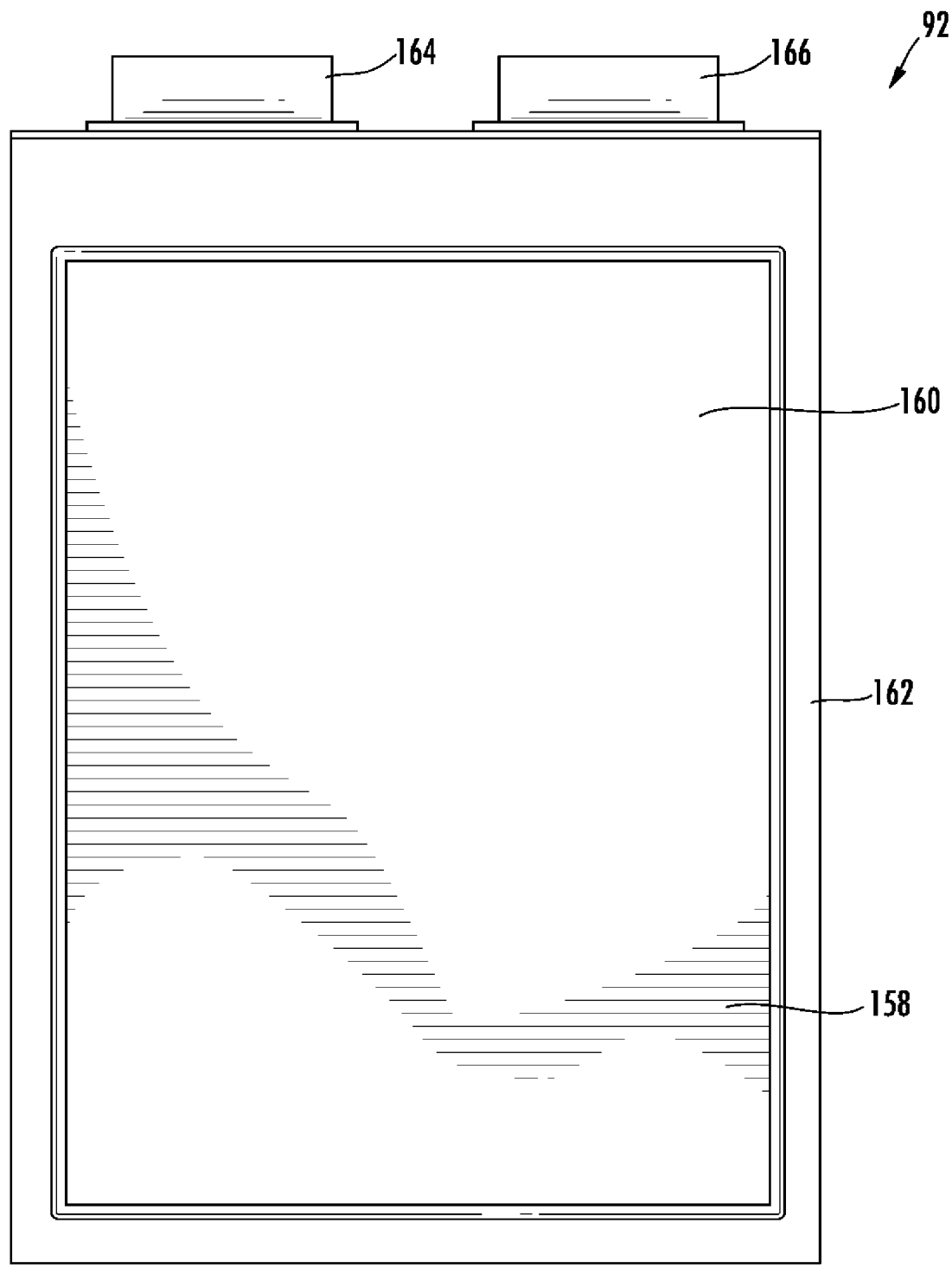
FIG. 14 is a schematic of a first side of a first battery cell utilized in the battery cell assembly of FIG. 3.
Figure 15:
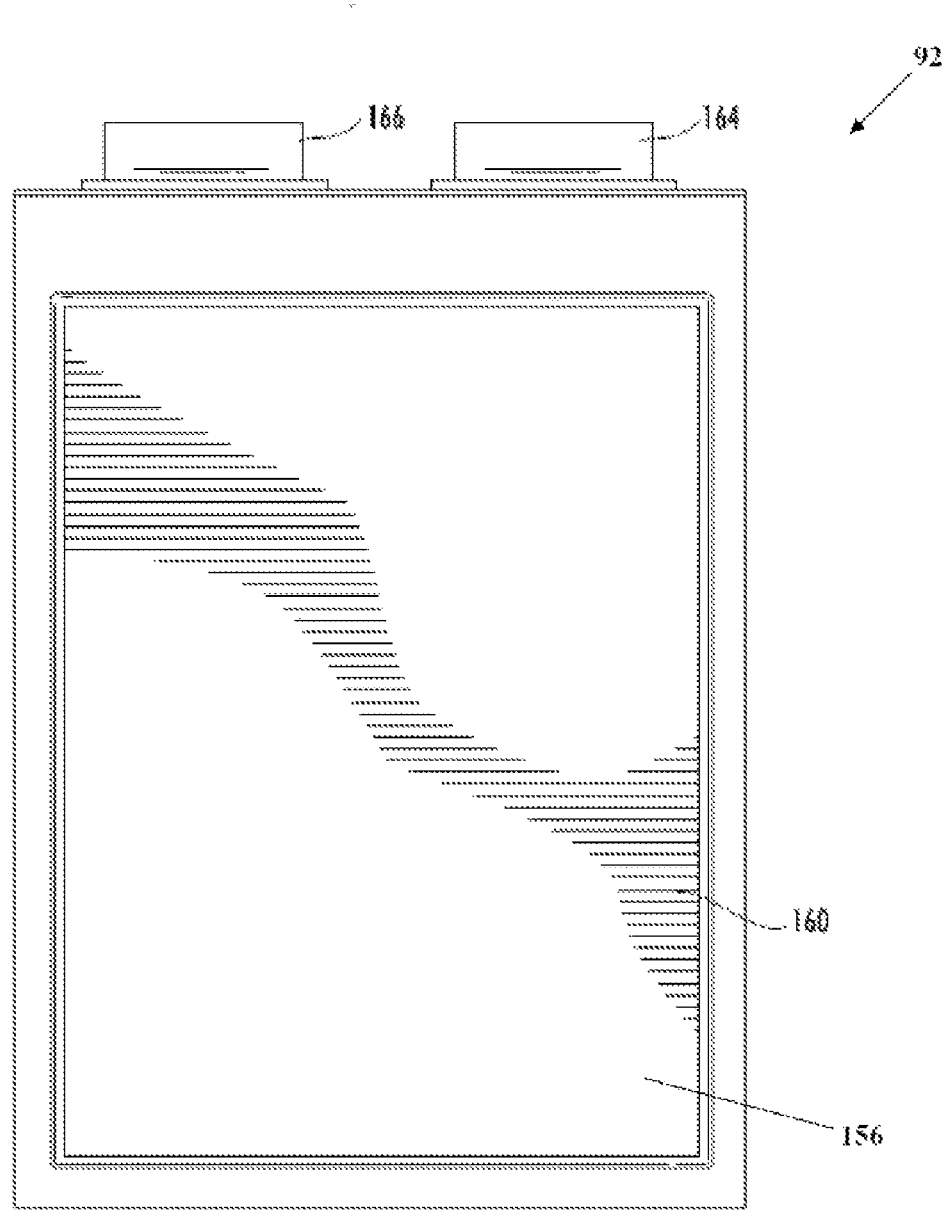
FIG. 15 is a schematic of a second side of the first battery cell of FIG. 14.

Referring to FIGS. 3, 14 and 15, the battery cell 92 is provided to output an operational voltage between the electrical terminals 164, 166. The battery cell 92 includes a body portion 160 and a peripheral lip portion 162 extending around the body portion 160, and electrical terminals 164, 166 extending from the body portion 160. The battery cell 92 is generally rectangular-shaped and includes a side 156 and a side 158 opposite the side 156. In one exemplary embodiment, the battery cell 92 is a lithium battery cell. Of course, in alternative embodiments, the battery cell 92 can comprise other types of battery cells known to those skilled in the art. The size of the peripheral lip portion 162 is smaller than a size of the rectangular ring-shaped frame member 90 such that the frame member 90 covers the peripheral lip portion 162 of the battery cell 92. Referring to FIGS. 6 and 7, the battery cell 92 is disposed between the frame member 90 and a portion of the securement ring-shaped member 94 and the battery cell 96.

Figure 16:
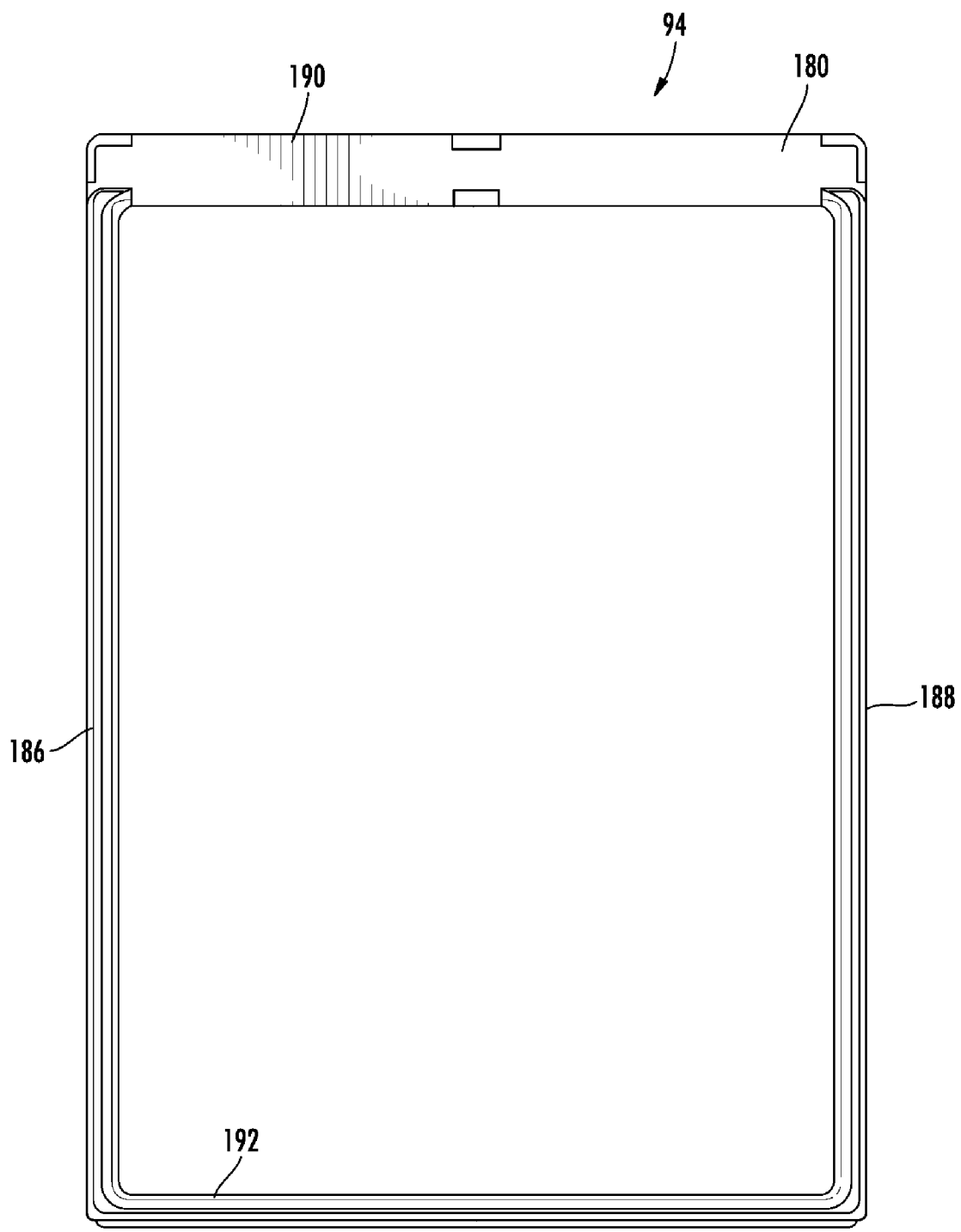
FIG. 16 is a schematic of a first side of a first securement ring-shaped member utilized in the battery cell assembly of FIG. 3.
Figure 17:
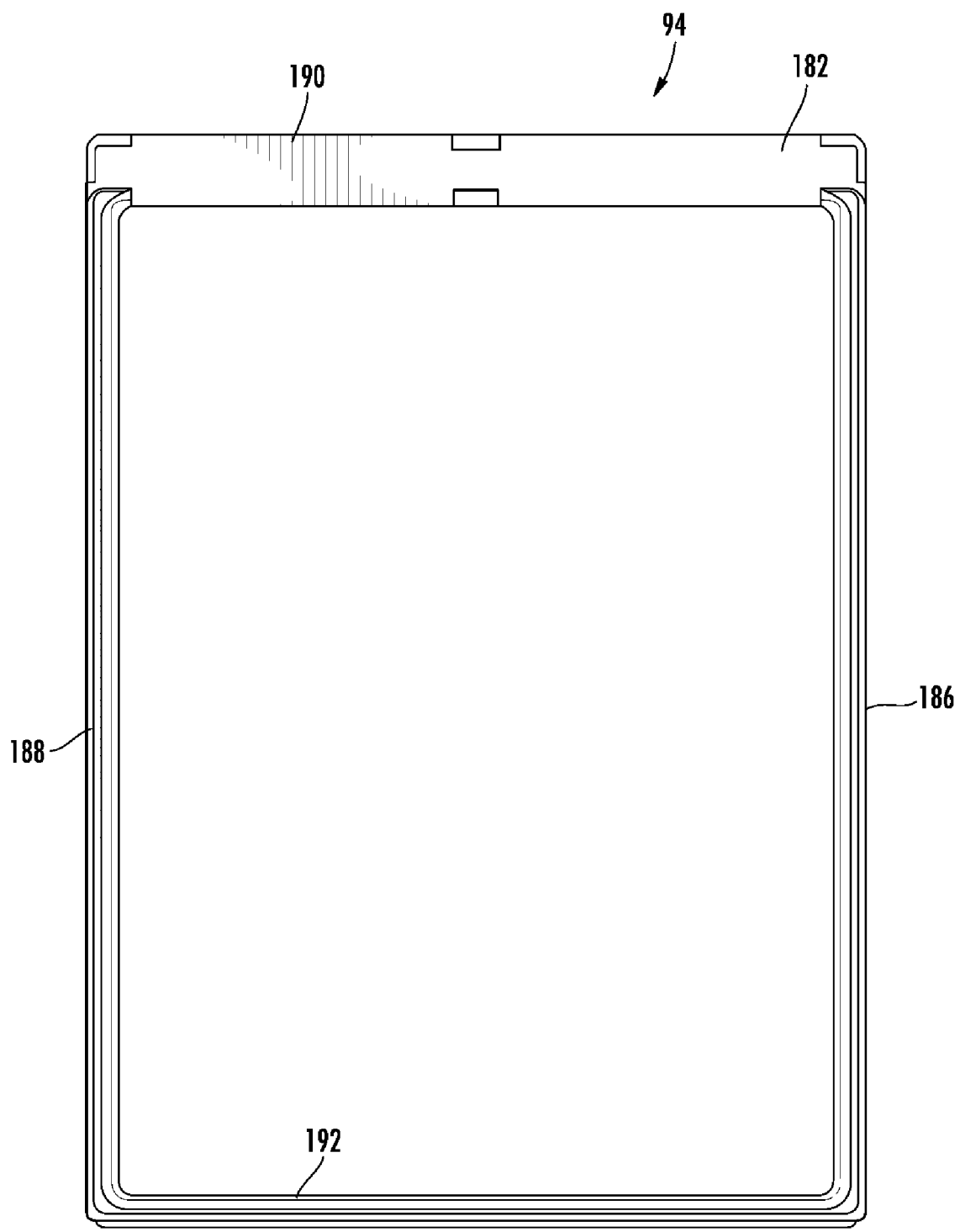
FIG. 17 is a schematic of a second side of the first securement ring-shaped member of FIG. 16.

Referring to FIGS. 3, 16 and 17, the securement ring-shaped member 94 is provided to further secure the battery cells 92, 96 between the rectangular ring-shaped members 90, 98. The securement ring-shaped member 94 includes a side 180 and an opposite side 182. Further, the securement ring-shaped member 94 includes side walls 186, 188 disposed away from one another and substantially parallel to one another. Further, the securement ring-shaped member 94 includes an upper wall 190 and a lower wall 192 extending between the side walls 186, 188. The side walls 186, 188, the upper wall 190 and the lower wall 192 define an open region 193 therebetween. An outer peripheral size of the securement ring-shaped member 94 is smaller than an outer peripheral size of the rectangular ring-shaped frame member 90 and smaller than an outer peripheral size of the rectangular ring-shaped frame member 98. Referring to FIGS. 6 and 7, the securement ring-shaped member 94 is disposed between the peripheral lip portions of the battery cells 92, 96 to further support the battery cells 92, 96.

Referring to FIGS. 3 and 6, the battery cell 96 is disposed between the rectangular ring-shaped frame member 98 and both a portion of the battery cell 92 and the securement ring-shaped member 94. The structure of the battery cell 96 is substantially similar to the battery cell 92.

Referring to FIGS. 3, 18, 19, 20 and 21, the rectangular ring-shaped frame member 98 is configured to be coupled to the rectangular ring-shaped frame member 90 for holding the battery cell 92, the securement ring-shaped member 94, and the battery cell 96 therebetween. Further, the rectangular ring-shaped frame member 98 is provided to couple to the rectangular ring-shaped frame member 106 for holding the heat exchanger 100, the securement ring-shaped member 102, and the battery cell 104 therebetween. The rectangular ring-shaped frame member 98 includes a side 200 and an opposite side 202. Further, in an exemplary embodiment, the frame member 98 includes side walls 214, 216, a lower wall 218, and an upper wall 220. The side walls 214, 216 are disposed apart from one another and are substantially parallel to one another. The lower wall 218 extends between the side walls 214, 216. Further, the upper wall 220 extends between the side walls 214, 216. The side walls 214, 216, the lower wall 218, and the upper wall 220 define an open region 222 therebetween.

Referring to FIGS. 3, 18, 19 and 20, the features of the rectangular ring-shaped frame member 98 on the side 200 will now be discussed. The lower wall 218 includes alignment-coupling features 230, 232 disposed on opposite ends of the lower wall 218. Further, the upper wall 220 includes alignment-coupling features 234, 236 disposed on opposite ends of the upper wall 220. The alignment-coupling features 230, 232, 234, 236 are configured to couple and align with alignment-coupling features 142, 140, 146, 144, respectively, on the side 112 of the rectangular ring-shaped frame member 90 shown in FIG. 11. Further, the side walls 214, 216, the lower wall 218, and the upper wall 220 define a ledge portion 238. Finally, referring to FIGS. 18 and 11, the side 200 of the frame member 98 includes a side coupling identifier "B" which indicates the side 200 is to be coupled to the side 112 of the frame member 90 having the side coupling identifier "B."

Figure 29:
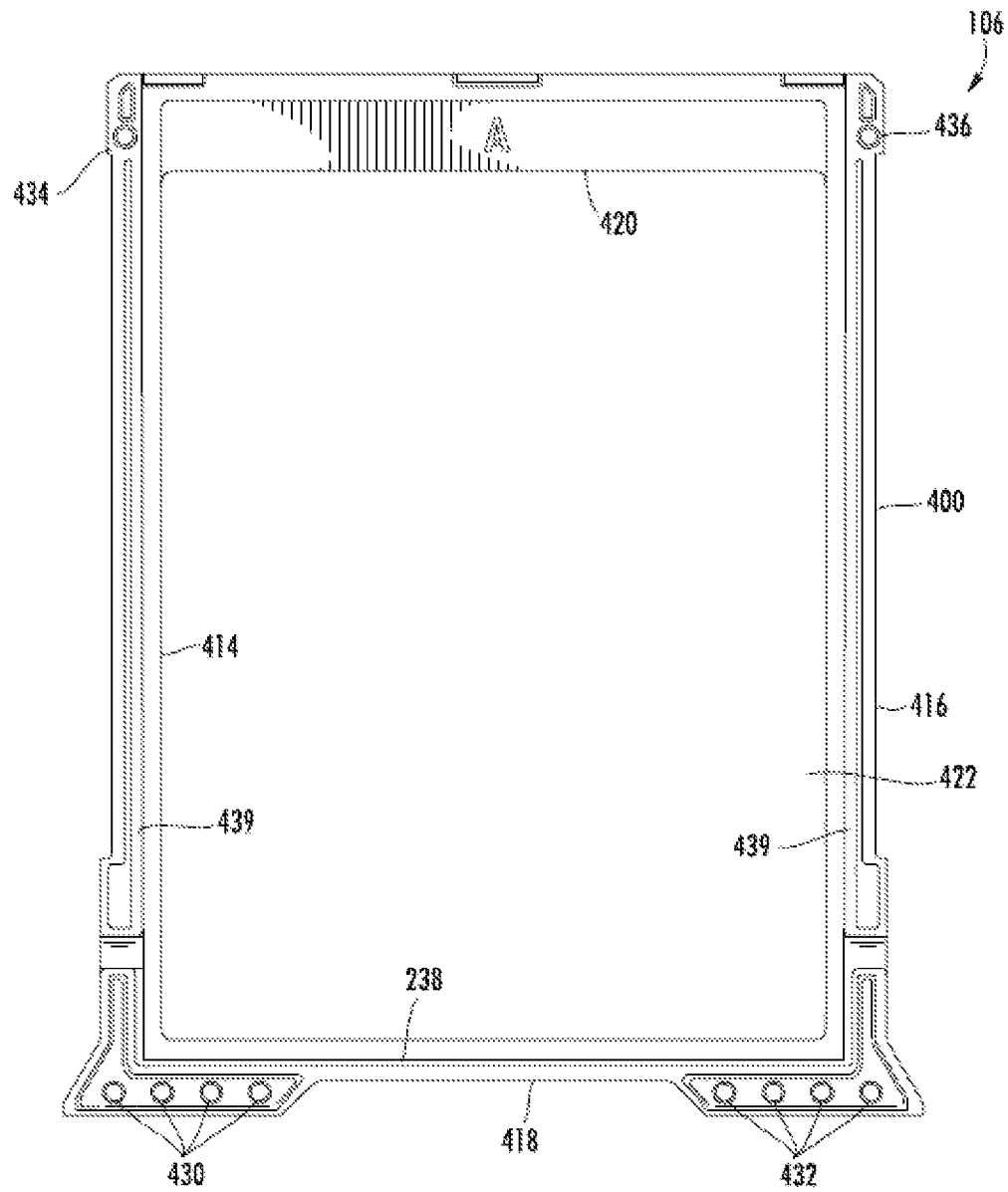
FIG. 29 is a schematic of a first side of a third rectangular ring-shaped frame member utilized in the battery cell assembly of FIG. 3.
Figure 30:
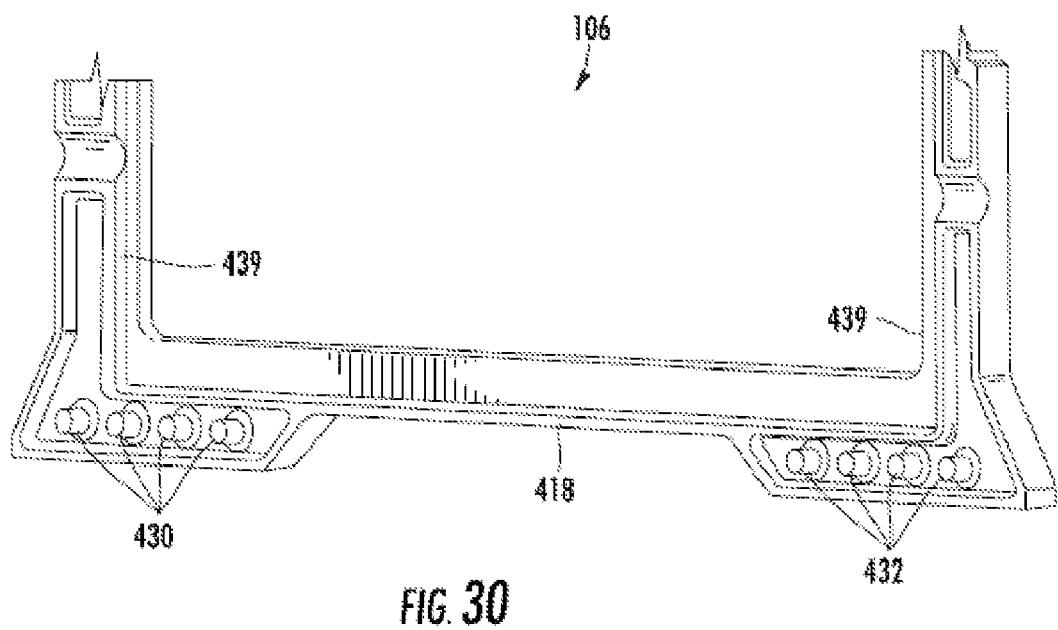
FIG. 30 is a schematic of a bottom portion of the first side of the third rectangular ring-shaped frame member of FIG. 29.
Figure 31:
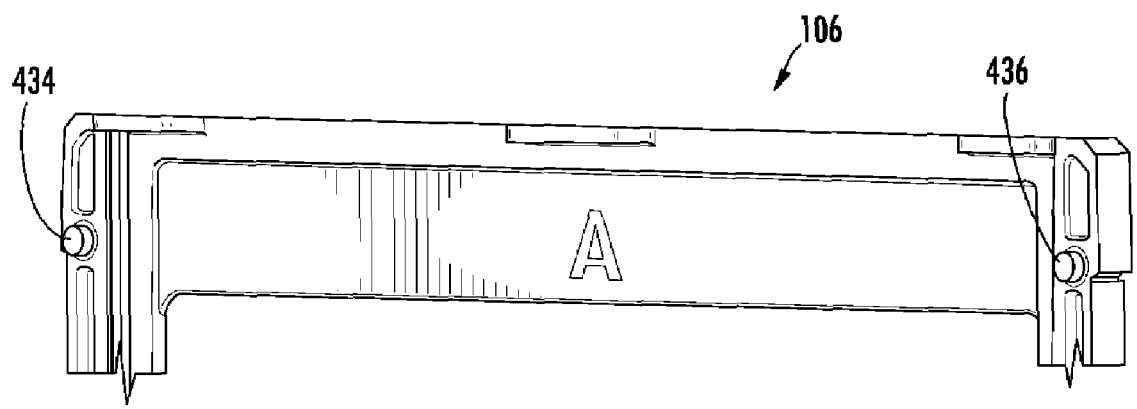
FIG. 31 is a schematic of a top portion of the first side of the third rectangular ring-shaped frame member of FIG. 29.
Figure 32:
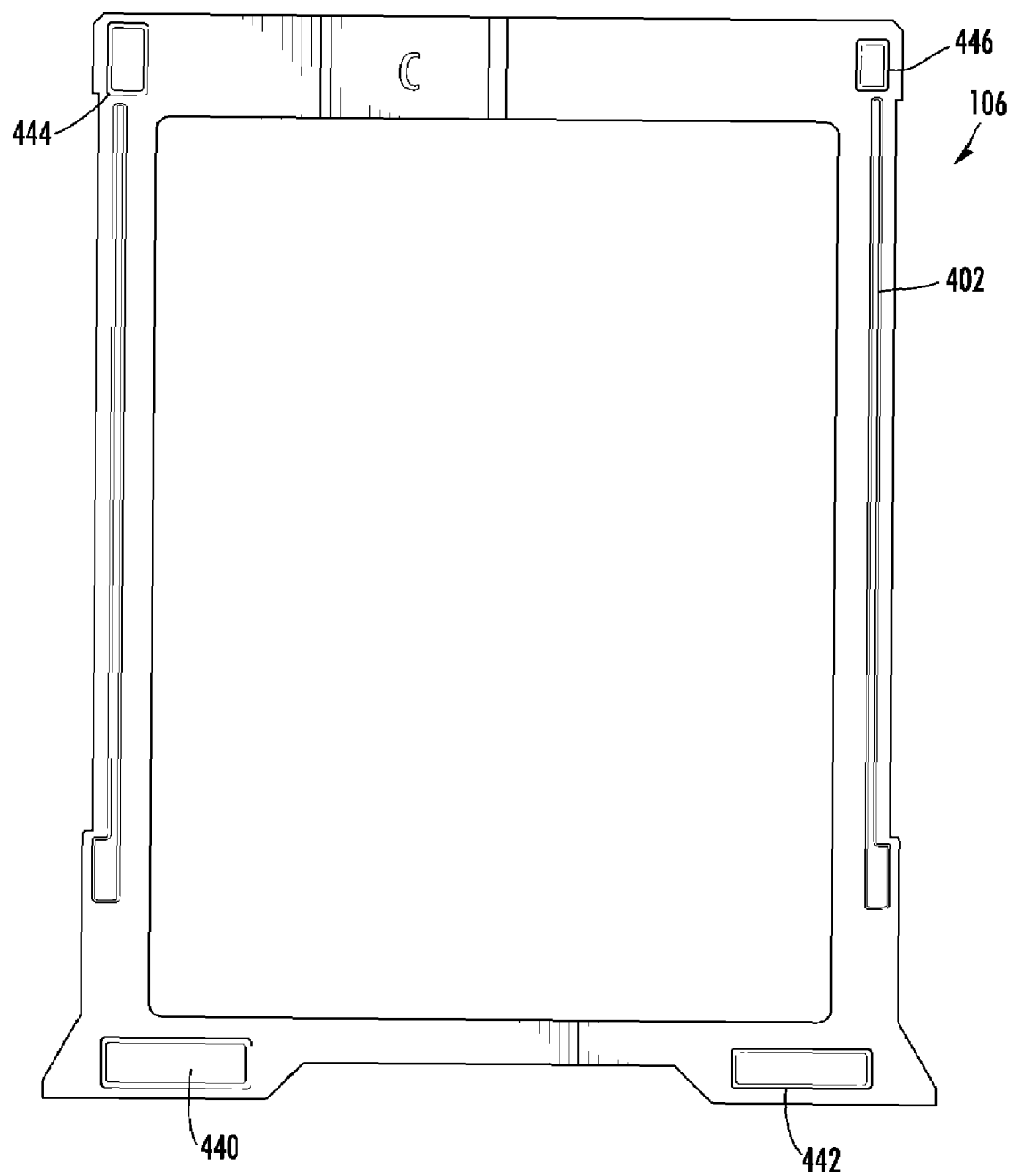
FIG. 32 is a schematic of a second side of the third rectangular ring-shaped frame member of FIG. 29.
Figure 33:
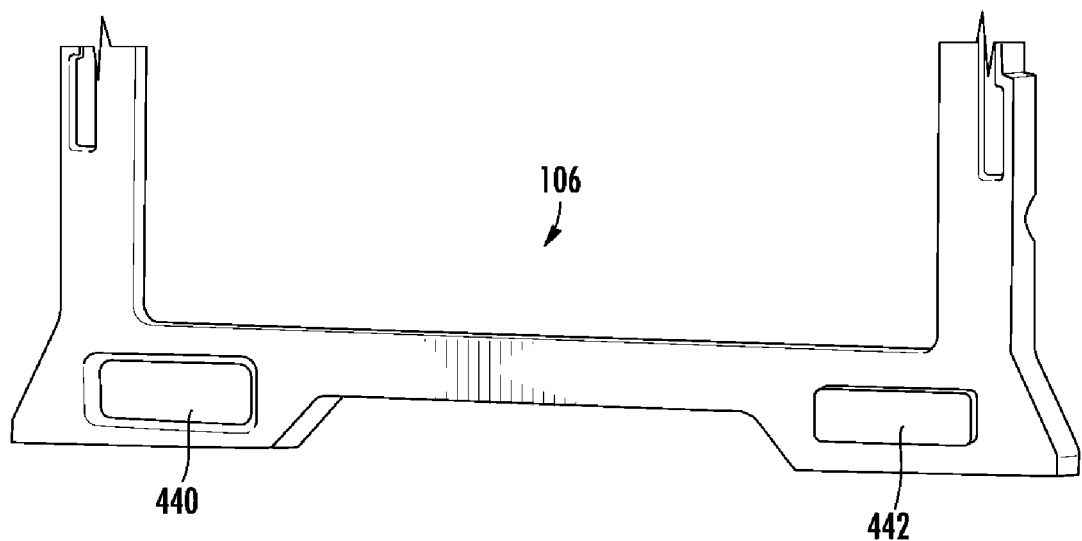
FIG. 33 is a schematic of a bottom portion of the second side of the third rectangular ring-shaped frame member of FIG. 32.
Figure 34:
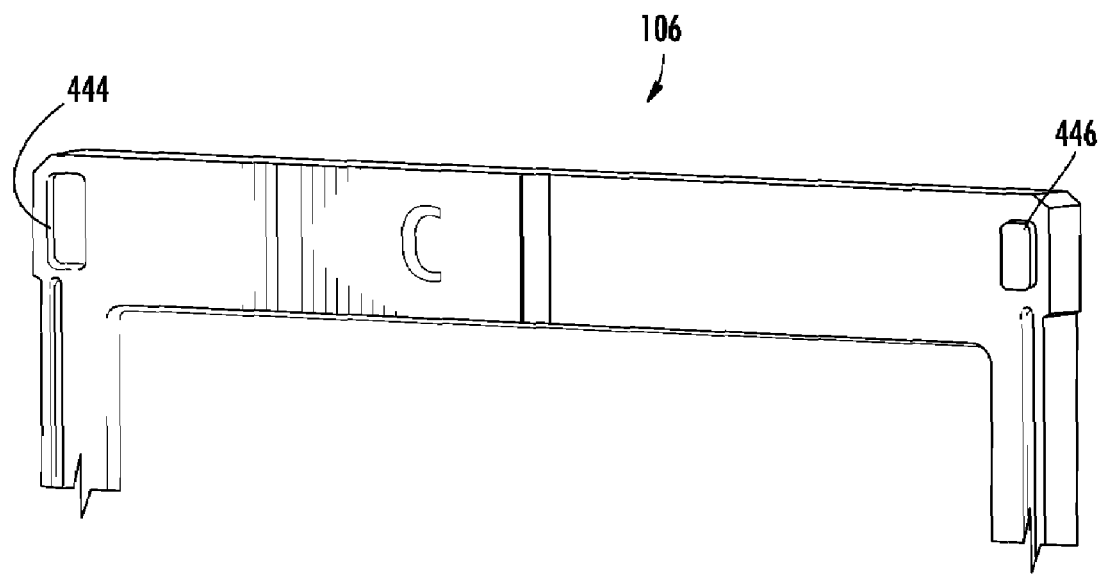
FIG. 34 is a schematic of a top portion of the second side of the third rectangular ring-shaped frame member of FIG. 21.

Referring to FIGS. 3, 21, 22 and 23, the features of the rectangular ring-shaped frame member 98 on the side 202 will now be discussed. The lower wall 218 includes alignment-coupling features 240, 242 disposed on opposite ends of the lower wall 218. Further, the upper wall 220 includes alignment-coupling features 244, 246 disposed on opposite ends of the upper wall 220. The alignment-coupling features 240, 242, 244, 246 are configured to couple and align with alignment-coupling features 432, 430, 436, 434, respectively, on the battery cell assembly 106 shown in FIG. 29. Further, the side walls 214, 216, the lower wall 218, and the upper wall 220 define a ledge portion 250 for receiving a portion of the heat exchanger 100 thereon. Further, the side walls 114, 116, have horizontal grooves 247, 248, respectively, for receiving a portion of an outlet port and an inlet port, respectively, of the heat exchanger 100 thereon. Finally, referring to FIGS. 21 and 29, the side 202 of the frame member 98 includes a side coupling identifier "A" that indicates the side 202 is to be coupled to the side 400 of the frame member 106 having the side coupling identifier "A."

Referring to FIGS. 3, 6, 7, 24 and 25, the heat exchanger 100 is configured to cool the battery cells 92, 96 and 104 to maintain the battery cells at a desired temperature. The heat exchanger 100 is disposed between (i) a portion of the battery cell 96 and the rectangular ring-shaped frame member 98, and (ii) a portion of the battery cell 104 and the securement ring-shaped member 102. The heat exchanger 100 includes a side 256 and an opposite side 258. The heat exchanger 100 further includes a housing 260, an inlet port 262, and an outlet port 264. The housing 260 defines a flow path 266 that extends from the inlet port 262 to the outlet port 264. During operation, fluid from the cooling manifold 78 flows through the inlet port 262 into the heat exchanger 100. Thereafter, the fluid flows through the flow path 266 to the outlet port 264. While flowing through the flow path 266, the fluid extracts heat energy from the battery cells 92, 96, 104 to cool the battery cells. From the outlet port 264, the heated fluid flows to the cooling manifold 80.

Figure 27:
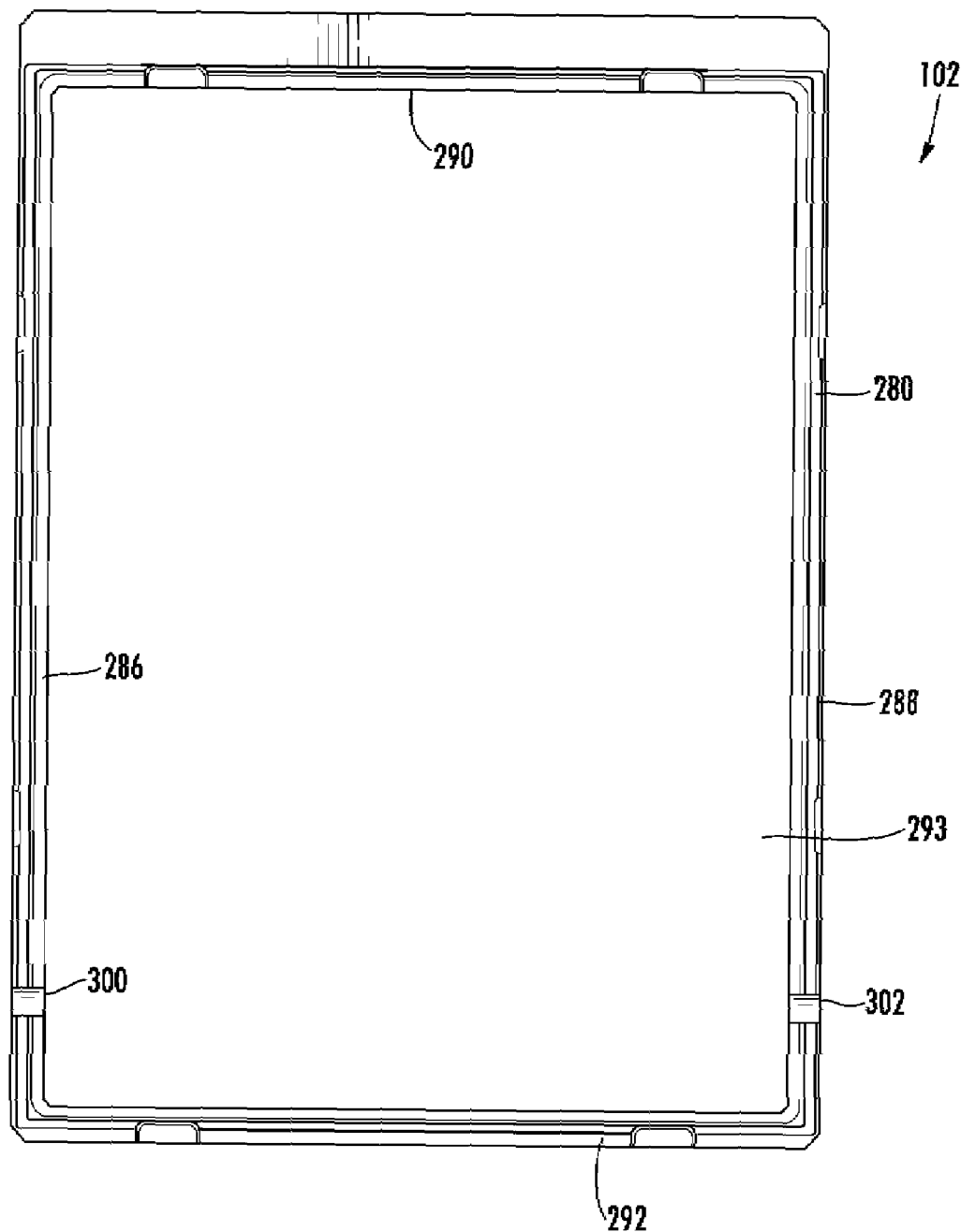
FIG. 27 is a schematic of a first side of a second securement ring-shaped member utilized in the battery cell assembly of FIG. 3.
Figure 28:
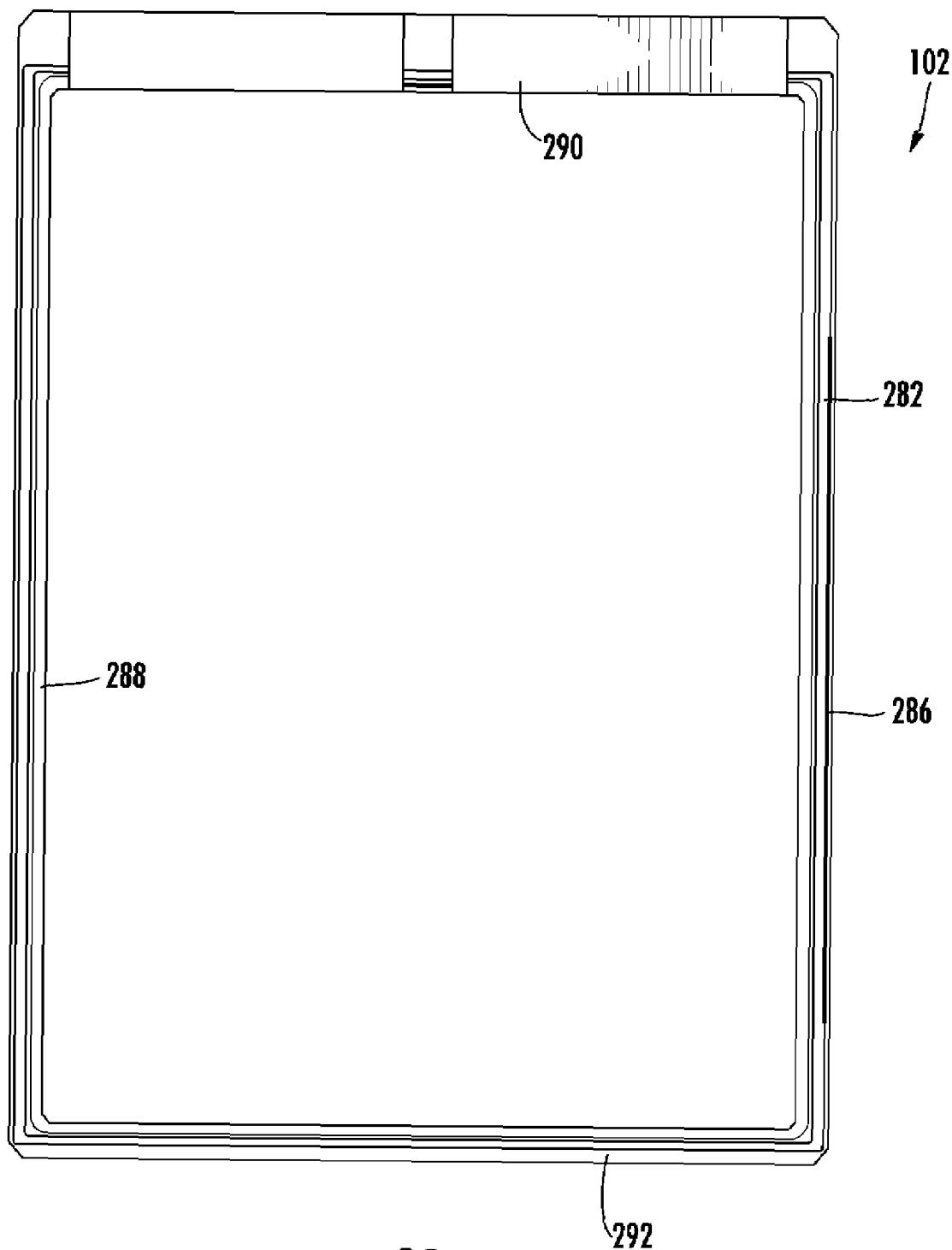
FIG. 28 is a schematic of a second side of the second securement ring-shaped member of FIG. 27.

Referring to FIGS. 3, 27 and 28, the securement ring-shaped member 102 is provided to further secure the heat exchanger 100 and the battery cell 104 between the rectangular ring-shaped members 90, 106. The securement ring-shaped member 102 includes a side 280 and an opposite side 282. Further, the securement ring-shaped member 102 includes side walls 286, 288 disposed away from one another and substantially parallel to one another. Further, the securement ring-shaped member 102 includes an upper wall 290 and a lower wall 292 extending between the side walls 286, 288. The side walls 286, 288, the upper wall 290 and the lower wall 292 define an open region 293 therebetween. The side walls 286, 288 on the side 280 include grooves 300, 302, respectively, for receiving the inlet port 262 and the outlet port 264, respectively, of the heat exchanger 100 thereon. An outer peripheral size of the securement ring-shaped member 102 is smaller than an outer peripheral size of the rectangular ring-shaped frame member 98 and smaller than an outer peripheral size of the rectangular ring-shaped frame member 106. Referring to FIGS. 6 and 7, the securement ring-shaped member 102 is disposed between the rectangular ring-shaped frame member 98 and a peripheral lip portion of the battery cell 104.

Referring to FIGS. 3 and 6, the battery cell 104 is disposed between the rectangular ring-shaped frame member 106 and both a portion of the heat exchanger 100 and the securement ring-shaped member 102. The structure of the battery cell 104 is substantially similar to the battery cell 92.

Referring to FIGS. 3, 29, 30, 31 and 32, the rectangular ring-shaped frame member 106 is configured to be coupled to the rectangular ring-shaped frame member 98 for holding the heat exchanger 100, the securement ring-shaped member 102, and the battery cell 104 therebetween. Further, the rectangular ring-shaped frame member 106 is provided to couple to the battery cell assembly 34 shown in FIG. 35 as will be explained in greater detail below. The rectangular ring-shaped frame member 106 includes a side 400 and an opposite side 402. Further, in an exemplary embodiment, the frame member 106 includes side walls 414, 416, a lower wall 418, and an upper wall 420. The side walls 414, 416 are disposed apart from one another and are substantially parallel to one another. The lower wall 418 extends between the side walls 414, 416. Further, the upper wall 420 extends between the side walls 414, 416. The side walls 414, 416, the lower wall 418, and the upper wall 420 define an open region 422 therebetween. Further, the side walls 414, 416, the lower wall 418, and the upper wall 420 define a ledge portion 238.

Referring to FIGS. 3, 29, 30 and 31, the features of the rectangular ring-shaped frame member 106 on the side 400 will now be discussed. The lower wall 418 includes alignment-coupling features 430, 432 disposed on opposite ends of the lower wall 418. Further, the upper wall 420 includes alignment-coupling features 434, 436 disposed on opposite ends of the upper wall 420. The alignment-coupling features 430, 432, 434, 436 are configured to couple and align with alignment-coupling features 242, 240, 246, 244, respectively, on the side 202 of the rectangular ring-shaped frame member 98 shown in FIG. 21. Further, the side walls 414, 416, the lower wall 418, and the upper wall 420 define a ledge portion 439. Finally, referring to FIGS. 21 and 29, the side 400 of the frame member 106 includes a side coupling identifier "A" that indicates the side 400 is to be coupled to the side 202 of the frame member 98 having the side coupling identifier "A."

Referring to FIGS. 3, 32, 33 and 34, the features of the rectangular ring-shaped frame member 106 on the side 402 will now be discussed. The lower wall 418 includes alignment-coupling features 440, 442 disposed on opposite ends of the lower wall 418. Further, the upper wall 420 includes alignment-coupling features 444, 446 disposed on opposite ends of the upper wall 420. The alignment-coupling features 440, 442, 444, 446 are configured to couple and align with alignment-coupling features 532, 530, 536, 534, respectively, on the battery cell assembly 34 shown in FIG. 34. Finally, referring to FIGS. 32 and 35, the side 402 of the frame member 106 includes a side coupling identifier "C" which indicates the side 402 is to be coupled to a side of the frame member 450 having the side coupling identifier "C."

Referring to FIG. 3, it should be noted that the alignment-coupling features on each of the rectangular ring-shaped frame members 90, 98, 106 have a different configuration from one another such that only a specific side of each of the rectangular ring-shaped members 90, 98, 106 can align and couple with another specific side of one of the other rectangular ring-shaped frame members 90, 98, 106.

Figure 35:
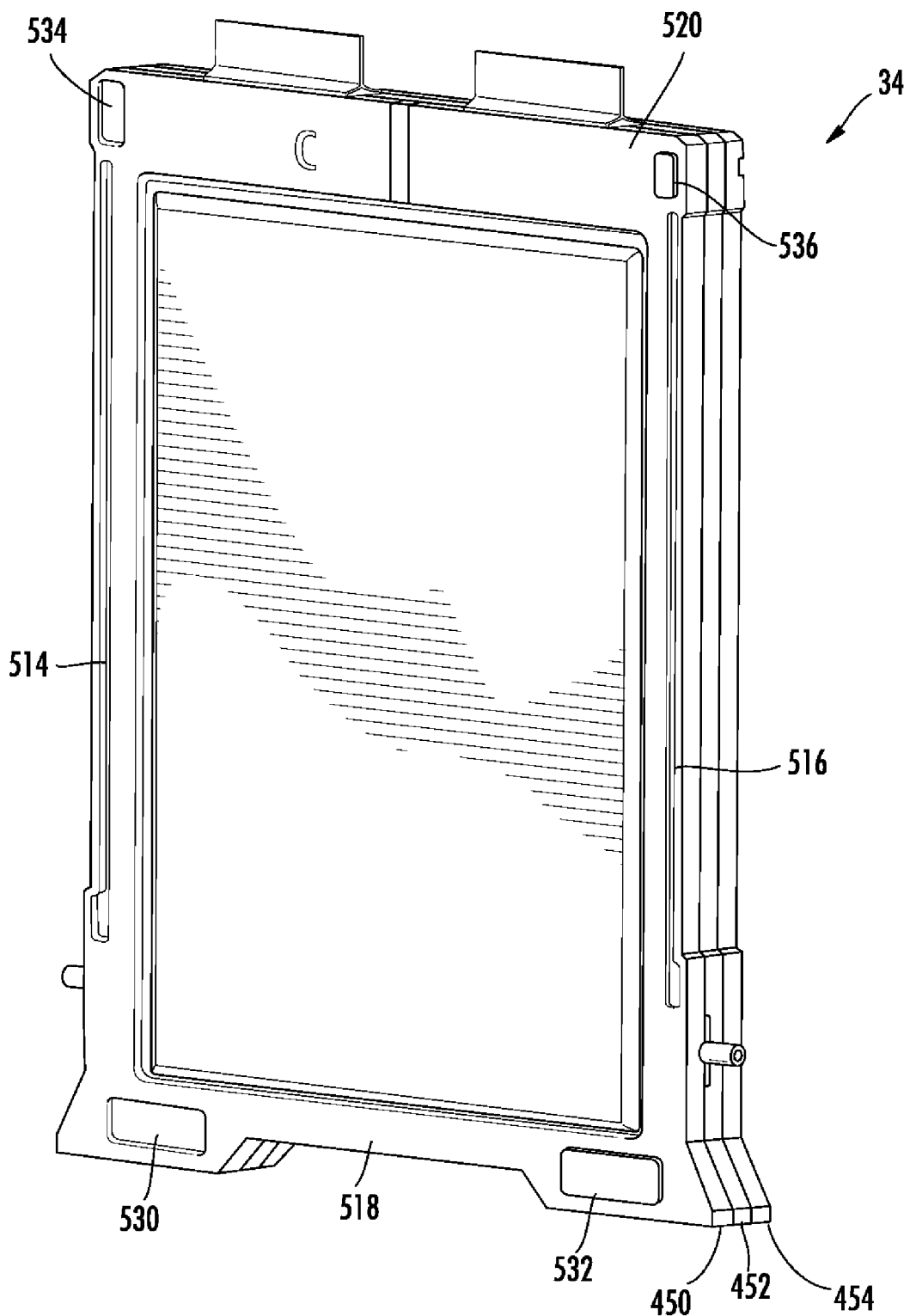
FIG. 35 is a schematic of another battery cell assembly utilized in the battery module of FIG. 2.

Referring to FIGS. 2 and 35, the battery cell assembly 34 is configured to be coupled to the battery cell assembly 32 in the battery module 20. The battery cell assembly 34 includes rectangular ring-shaped frame members 450, 452, 454. Further, the battery cell assembly 34 includes two battery cells, two securement frame members and an heat exchanger contained within the frame members 450, 452, 454. The rectangular ring-shaped frame member 450 includes side walls 514, 516, a lower wall 518, and an upper wall 520. The side walls 514, 516 are disposed apart from one another and are substantially parallel to one another. The lower wall 518 extends between the side walls 514, 516. Further, the upper wall 520 extends between the side walls 514, 516. The side walls 514, 516, the lower wall 518, and the upper wall 520 define an open region therebetween. The lower wall 518 includes alignment-coupling features 530, 532 disposed on opposite ends of the lower wall 518. Further, the upper wall 520 includes alignment-coupling features 534, 536 disposed on opposite ends of the upper wall 520. The alignment-coupling features 530, 532, 534, 536 are configured to couple and align with alignment-coupling features 442, 440, 446, 444, respectively, on the side 402 of the rectangular ring-shaped frame member 106 shown in FIG. 32.

Figure 36:
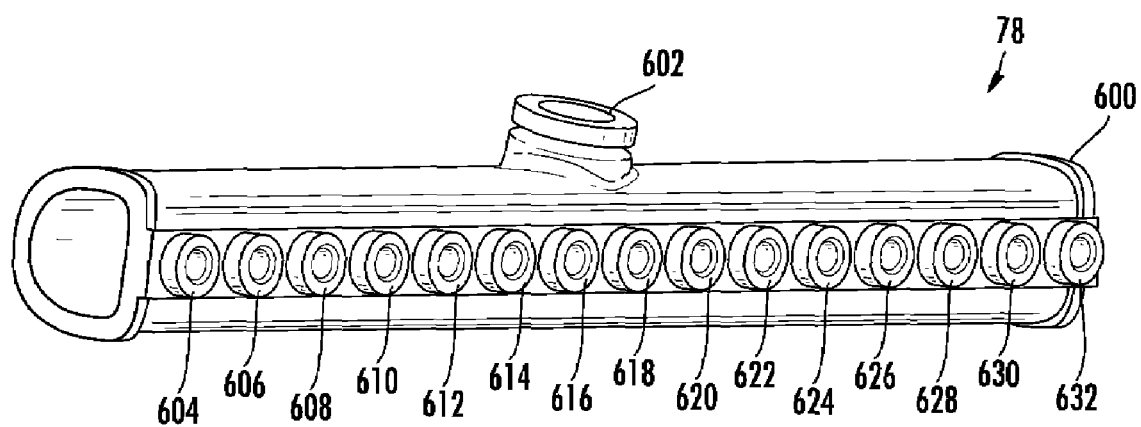
FIG. 36 is a schematic of a cooling manifold utilized in the battery module of FIG. 1.

Referring to FIGS. 1 and 36, the cooling manifold 78 will be explained in further detail. In particular, the cooling manifold 78 is configured to route a fluid to inlet ports on the heat exchangers 50, 52, 54, 56 and to the heat exchangers in the battery cell assemblies 30, 32, 34, 36, 40, 42, 44. The cooling manifold 78 includes a tubular member 600, an inlet port 602, and outlet ports 604, 606, 608, 610, 612, 614, 616, 618, 620, 622, 624, 626, 628, 630, 632. The inlet port 602 is provided to receive fluid from a fluid reservoir into the tubular member 600. The tubular member 600 routes the fluid through the outlet ports 604, 606, 608, 610, 612, 614, 616, 618, 620, 622, 624, 626, 628, 630, 632 to the respective inlet ports of the heat exchangers in the battery module 20. The cooling manifold 78 can be constructed from rubber or a rubber compound. Of course, in an alternative embodiment, the cooling manifold 78 can be constructed from other materials such as plastics, metals, or ceramics. The cooling manifold 80 has a substantially similar construction as the cooling manifold 78. The cooling manifold 80 is configured to receive heated fluid from outlet ports of the heat exchangers in the battery module 20 and to route the heated fluid to a fluid reservoir.

The battery module 20 has a battery cell assembly that provides a substantial advantage over other batteries. In particular, the battery cell assembly provides a technical effect of cooling battery cells disposed on two sides of a heat exchanger to maintain the battery cells at a desired temperature.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

We claim:

1. A battery cell assembly, comprising:
    a first battery cell having a first side and a second side;
    a second battery cell having a first side and a second side, the first side of the second battery cell directly contacting the second side of the first battery cell;
    a heat exchanger having a first side and a second side, the first side of the heat exchanger directly contacting the second side of the second battery cell; and
    a third battery cell having a first side and a second side, the first side of the third battery cell directly contacting the second side of the heat exchanger, the heat exchanger being configured to remove heat energy from the first, second, and third battery cells to maintain the first, second, and third battery cells at substantially a desired temperature;
    a first rectangular ring-shaped frame member having a first side and a second side, the second side of the first rectangular ring-shaped frame member directly contacting the first side of the first battery cell;

a second rectangular ring-shaped frame member having a first side and a second side, the first side of the second rectangular ring-shaped frame member directly contacting both the second side of the first rectangular ring-shaped frame member and the second side of the second battery cell; and a first securement ring-shaped member having a first side and a second side, an outer peripheral size of the first securement ring-shaped member being less than an outer peripheral size of the first rectangular ring-shaped frame member, the first securement ring-shaped member being disposed between the second side of the first rectangular ring-shaped frame member and the first side of the second rectangular ring-shaped frame member to further secure the first and second battery cells between the first and second rectangular ring-shaped frame members.

2. The battery cell assembly of claim 1, further comprising a third rectangular ring-shaped frame member having a first side and a second side, the first side of the third rectangular ring-shaped frame member contacting both the second side of the second rectangular ring-shaped frame member and the second side of the third battery cell.

3. The battery cell assembly of claim 2, further comprising a second securement ring-shaped member having a first side and a second side, an outer peripheral size of the second securement ring-shaped member being less than an outer peripheral size of the third rectangular ring-shaped frame member, the second securement ring-shaped member being disposed between the second side of the second rectangular ring-shaped frame member and the first side of the third rectangular ring-shaped frame member to further secure the third battery cell between the second and third rectangular ring-shaped frame members.

4. The battery cell assembly of claim 1, wherein the first battery cell is a lithium-ion battery cell.

5. A battery module, comprising:
a first battery cell assembly having a first battery cell with a first side and a second side;
the first battery cell assembly further having a second battery cell with a first side and a second side, the first side of the second battery cell directly contacting the second side of the first battery cell;
the first battery cell assembly further having a first heat exchanger with a first side and a second side, the first side of the first heat exchanger directly contacting the second side of the second battery cell;
the first battery cell assembly further having a third battery cell with a first side and a second side, the first side of the third battery cell directly contacting the second side of the first heat exchanger, the first heat exchanger being configured to remove heat energy from the first, second, and third battery cells to maintain the first, second, and third battery cells at substantially a desired temperature;
the first battery cell assembly further comprises a first rectangular ring-shaped frame member having a first side and a second side, the second side of the first rectangular ring-shaped frame member directly contacting the first side of the first battery cell;
the first battery cell assembly further comprises a second rectangular ring-shaped frame member having a first side and a second side, the first side of the second rectangular ring-shaped frame member directly contacting both the second side of the first rectangular ring-shaped frame member and the second side of the second battery cell;

the first battery cell assembly further comprises a first securement ring-shaped member having a first side and a second side, an outer peripheral size of the first securement ring-shaped member being less than an outer peripheral size of the first rectangular ring-shaped frame member, the first securement ring-shaped member being disposed between the second side of the first rectangular ring-shaped frame member and the first side of the second rectangular ring- shaped frame member to further secure the first and second battery cells between the first and second rectangular ring-shaped frame members;

a second battery cell assembly having a fourth battery cell with a first side and a second side, the first side of the fourth battery cell directly contacting the second side of the third battery cell of the first battery cell assembly;
the second battery cell assembly further having a second heat exchanger with a first side and a second side, the first side of the second heat exchanger directly contacting the second side of the fourth battery cell;
the second battery cell assembly further having a fifth battery cell with a first side and a second side, the first side of the fifth battery cell directly contacting the second side of the second heat exchanger; and
the second battery cell assembly further having a sixth battery cell with a first side and a second side, the first side of the sixth battery cell directly contacting the second side of the fifth battery cell, the second heat exchanger being configured to remove heat energy from the fourth, fifth and sixth battery cells to maintain the fourth, fifth and sixth battery cells at substantially the desired temperature.

6. The battery module of claim 5, wherein the first battery cell assembly further comprises a third rectangular ring-shaped frame member having a first side and a second side, the first side of the third rectangular ring-shaped frame member contacting both the second side of the second rectangular ring-shaped frame member and the second side of the third battery cell.

7. The battery module of claim 6, wherein the first battery cell assembly further comprises a second securement ring-shaped member having a first side and a second side, an outer peripheral size of the second securement ring-shaped member being less than an outer peripheral size of the third rectangular ring-shaped frame member, the second securement ring-shaped member being disposed between the second side of the second rectangular ring-shaped frame member and the first side of the third rectangular ring-shaped frame member to further secure the third battery cell between the second and third rectangular ring-shaped frame members.

8. The battery module of claim 5, wherein the first battery cell is a lithium-ion battery cell.

9. A battery cell assembly, comprising:
a first battery cell having a first side and a second side;
a second battery cell having a first side and a second side, the first side of the second battery cell directly contacting the second side of the first battery cell;
a heat exchanger having a housing with a first side and a second side, the heat exchanger further having an inlet port and an outlet port coupled to the housing, the inlet port extending outwardly from the housing, the outlet port extending outwardly from the housing, the first side of the heat exchanger directly contacting the second side of the second battery cell, the inlet port configured to receive a fluid therein such that the fluid flows from the inlet port through the housing and through the outlet port;

a third battery cell having a first side and a second side, the first side of the third battery cell directly contacting the second side of the heat exchanger, the heat exchanger removing heat energy from the first, second, and third battery cells to maintain the first, second, and third battery cells at substantially a desired temperature;

a first rectangular ring-shaped frame member having a first side and a second side, the second side of the first rectangular ring-shaped frame member directly contacting the first side of the first battery cell; and a second rectangular ring-shaped frame member having a first side and a second side, the first side of the second rectangular ring-shaped frame member directly contacting both the second side of the first rectangular ring-shaped frame member and the second side of the second battery cell.

10. The battery cell assembly of claim 9, wherein a thickness of the heat exchanger from the first side of the housing of the heat exchanger to the second side of the housing of the heat exchanger is less than a thickness of the first battery cell from the first side of the first battery cell to the second side of the first battery cell.

11. The battery cell assembly of claim 9, wherein a size of an outer periphery of the housing of the heat exchanger is less than a size of an outer periphery of the first rectangular ring-shaped frame member.

* * * * *